US007999221B2

(12) United States Patent
Plows et al.

(10) Patent No.: US 7,999,221 B2
(45) Date of Patent: Aug. 16, 2011

(54) MASS SPECTROMETRIC DETECTION OF MATERIAL TRANSFERRED TO A SURFACE

(75) Inventors: Fiona Plows, Redwood City, CA (US); Steven Roth, Morgan Hill, CA (US); Mariana Rusa, Albany, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 262 days.

(21) Appl. No.: 12/477,080

(22) Filed: Jun. 2, 2009

(65) Prior Publication Data

US 2009/0321629 A1 Dec. 31, 2009

Related U.S. Application Data

(60) Provisional application No. 61/058,152, filed on Jun. 2, 2008.

(51) Int. Cl.
*H01J 49/26* (2006.01)
*B01D 59/44* (2006.01)

(52) U.S. Cl. ........ 250/282; 250/281; 250/288; 250/428; 250/251; 436/173; 436/177

(58) Field of Classification Search .................. 250/282, 250/281, 288, 428, 251; 436/173, 177
See application file for complete search history.

(56) References Cited

U.S. PATENT DOCUMENTS 5,045,694 A 9/1991 Beavis et al.
5,118,937 A 6/1992 Hillenkamp et al.
5,808,300 A * 9/1998 Caprioli ........................ 250/288
6,027,942 A 2/2000 Hutchens et al.
6,844,165 B2 1/2005 Hutchens et al.
7,183,544 B2 2/2007 Boschetti et al.
7,276,381 B2 10/2007 Kitagawa
7,517,496 B2 4/2009 Pohl
7,541,003 B2 6/2009 Pohl et al.
2003/0124371 A1 7/2003 Um et al.
2003/0218130 A1 11/2003 Boschetti et al.
2004/0005582 A1* 1/2004 Shipwash ......................... 435/6
2005/0112650 A1 5/2005 Chang et al.
2006/0183242 A1 8/2006 Huang et al.
2006/0183863 A1 8/2006 Huang et al.
2007/0082019 A1 4/2007 Huang et al.
2007/0224697 A1* 9/2007 Park .............................. 436/173
2007/0254378 A1 11/2007 Zhang et al.

FOREIGN PATENT DOCUMENTS

EP 1550862 A 7/2005

* cited by examiner

*Primary Examiner* — Nikita Wells
(74) *Attorney, Agent, or Firm* — Morgan, Lewis & Bockius, LLP

(57) ABSTRACT

The present invention provides methods for using detection methods, including mass spectrometry methods such as SELDI-TOF-MS, to detect and analyze molecules directly transferred from a sample to a surface to form a molecular print of the sample. Methods and compositions of the invention can be used to produce spatially and non-spatially oriented molecular prints for detection using methods such as mass spectrometry. Methods and compositions of the invention encompass molecular printing of tissues, cells and gels onto surfaces.

25 Claims, 24 Drawing Sheets

C

A

B

C

A

B

A

B

A

B

Correlation coefficients for 8 spectra

| | Icorrel | SNcorrel |
|---|---|---|
| 16 | 0.982552 | 0.851256 |
| 17 | 0.991081 | 0.990788 |
| 18 | 0.991841 | 0.96766 |
| 19 | 0.984837 | 0.92601 |
| 20 | 0.985006 | 0.958011 |
| 21 | 0.988082 | 0.975276 |
| 22 | 0.976332 | 0.828099 |

A

B

Correlation coefficients for 7 spectra

| | Icorrel | SNcorrel |
|---|---|---|
| 2 | 0.972055 | 0.980837 |
| 3 | 0.872294 | 0.877671 |
| 4 | 0.931166 | 0.919936 |
| 5 | 0.946029 | 0.938083 |
| 6 | 0.855395 | 0.743733 |
| 7 | 0.783436 | 0.838211 |

A

B

Binding buffer

Wash

A

B

A

B

C

MASS SPECTROMETRIC DETECTION OF MATERIAL TRANSFERRED TO A SURFACE

CROSS-REFERENCE TO RELATED APPLICATIONS

This application claims the benefit of priority to U.S. Provisional Patent Application No. 61/058,152, filed on Jun. 2, 2008, which is hereby incorporated by reference in its entirety.

BACKGROUND OF THE INVENTION

One use of detection methods such as mass spectrometry is the analysis of samples (such as tissues and cells) in which molecular spectra are correlated with morphological features of the samples. Correlation of mass spectra to morphological features can provide information regarding spatial distribution of biomarkers, differences in the spatial distribution of molecules between healthy and diseased tissue, compartmentalization of molecules, site-specific metabolic processing, as well as information on selective binding domains for a wide variety of natural and synthetic compounds.

Variations in surface morphology, degradation of samples, and the complexity and dynamic range of molecules present in any biological sample, such as tissues and cells, can produce artifacts and errors in the process of correlating molecular spectra to morphological features. As a result, such mass spectrometry analyses may be limited to only those molecular species which are in high abundance in a sample and which desorb easily, thus limiting the ability to analyze and effectively depict a quantity of molecules of interest with specific atomic mass or within a range of atomic mass (i.e., an "atomic mass window") as a function of the position of the molecules in a sample.

SUMMARY OF THE INVENTION

Accordingly, the present invention provides methods and compositions for using detection methods such as mass spectrometry to detect and visually depict quantitative information of atomic mass of molecules in a sample as a function of the spatial arrangement of those molecules in the sample. Advantages of the present invention include the large capacity of surfaces of the invention for retaining molecules from the sample, as well as the specificity of these surfaces for sample molecules of interest; in addition, the present invention provides methods and compositions which ease the preparation of samples for analysis and the transfer of those samples to a surface. Any detection method may be used with the molecular prints formed from the transfer of samples directly to a surface using methods and compositions of the invention. Mass spectrometry detection methods are particularly amenable to the molecular prints of the invention.

In one aspect, the invention provides a method of analyzing spatial arrangement of molecules within a sample. This method includes the step of transferring a sample to a surface such that the spatial arrangement of the molecules is maintained. In a further aspect, the surface includes an adsorbent film, and the method includes the step of detecting adsorbence of the molecules on the adsorbent film.

In a further aspect, the invention provides a method of analyzing a sample. In this method, a sample is transferred to a surface to form a test surface. The test surface is struck with a laser beam such that a predetermined first laser spot on the test surface releases first sample molecules. The molecular atomic masses of released first sample molecules over a range of atomic masses are measured. The method further includes the step of striking the test surface with the laser beam such that a predetermined second laser spot on the test surface releases second sample molecules, and the molecular atomic mass of the released second sample molecules are also measured over a range of atomic masses. An atomic mass window within the range of atomic masses is then analyzed to determine the spatial arrangement of molecules within the sample.

In still further aspect, the invention provides an apparatus for analyzing a test sample. This apparatus includes a test specimen comprising sample molecules of interest. In this aspect, the test specimen is in operative contact with a polymeric material, and the polymeric material comprises an affinity reagent. The apparatus includes a fluence source for sequentially striking the test specimen at a plurality of predetermined spots for sequentially releasing sample molecules from the spots. In a still further aspect, the apparatus includes a mass analyzer for measuring atomic mass of the released sample molecules over a range of atomic masses. In a yet further aspect, the apparatus includes a computer system for receiving atomic mass data from said mass analyzer and a display for depicting atomic mass as a function of individual spots on the test specimen.

BRIEF DESCRIPTION OF THE FIGURES

FIG. 5A is a comparison of mass spectra from single-species transfer of molecular weight standards to H50 surface (top trace) and Q10 surface (bottom two traces). FIG. 5B is a comparison of mass spectra from transfer of molecular weight standards to CM10 surface.

FIG. 6B shows a more detailed view of the spectrum in FIG. 6A.

FIG. 22A shows spectra from a five minute incubation. FIG. 22B shows spectra from a one hour incubation.

FIG. 23A shows spectra from a CM10 chip. FIG. 23B shows spectra from a Q10 chip. FIG. 23C shows spectra from an H50 chip.

DETAILED DESCRIPTION OF THE PREFERRED EMBODIMENTS

Figure 1:
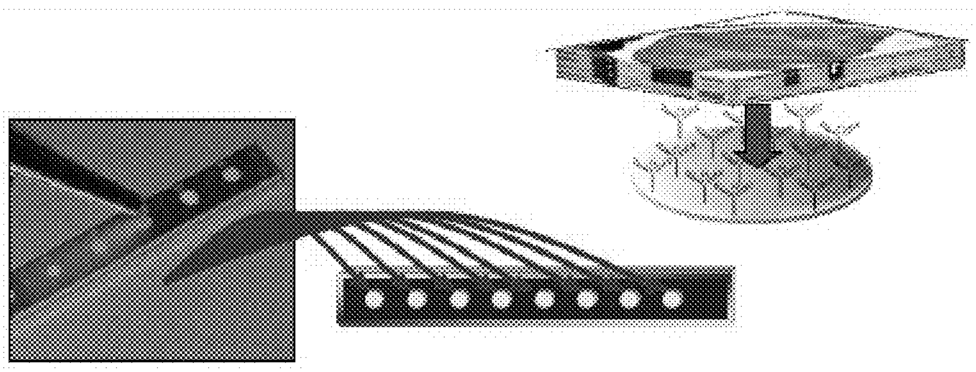
FIG. 1 is a schematic illustration of an embodiment of the invention in which (A) a sample is placed on a surface comprising binding or reactive functionalities, (B) unbound sample molecules are removed and (C) bound sample molecules are detected using a mass spectrometry method.
Figure 1:
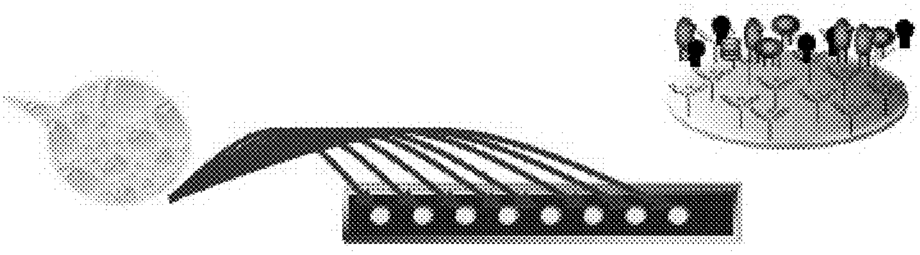
Figure 1:
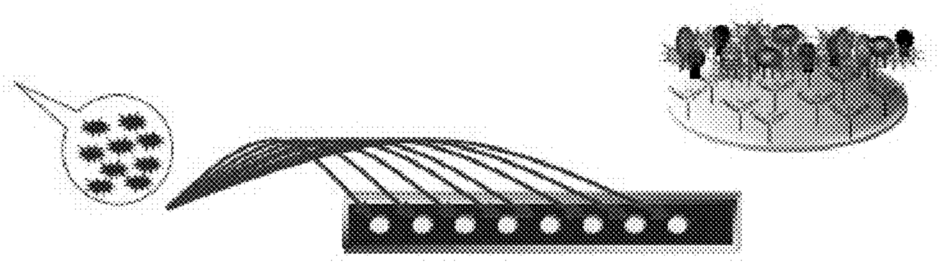

Unless defined otherwise, all technical and scientific terms used herein have the same meaning as commonly understood by one of ordinary skill in the art to which this invention belongs. All publications mentioned herein are incorporated herein by reference for the purpose of describing and disclosing devices, formulations and methodologies which are described in the publication and which might be used in connection with the presently described invention.

Note that as used herein and in the appended claims, the singular forms "a," "an," and "the" include plural referents unless the context clearly dictates otherwise. Thus, for example, reference to "a polymerase" refers to one agent or mixtures of such agents, and reference to "the method" includes reference to equivalent steps and methods known to those skilled in the art, and so forth.

Where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either both of those included limits are also included in the invention.

In the following description, numerous specific details are set forth to provide a more thorough understanding of the present invention. However, it will be apparent to one of skill in the art that the present invention may be practiced without one or more of these specific details. In other instances, well-known features and procedures well known to those skilled in the art have not been described in order to avoid obscuring the invention. It will be apparent to one of skill in the art that these additional features are also encompassed by the present invention.

Abbreviations

"EAM" refers to "energy absorbing moiety", "energy absorbing molecule" and "energy absorbing matrix", all of which, unless otherwise noted, are used interchangeably herein "SPA" refers to sinapinic acid "CHCA" refers to α-cyano-4-hydroxy-succinic acid "H50" refers to a hydrophobic hydrogel or a chip incorporating a hydrophobic hydrogel.

"CM10" refers to a weak cation exchanger hydrogel or a chip incorporating such a hydrogel.

"Q10" refers to a strong anion exchanger hydrogel or a chip incorporating such a hydrogel.

"SELDI" refers to Surface-Enhanced Laser Desorption and Ionization.

"MALDI" refers to Matrix Assisted Laser-Desorption Ionization.

Definitions

Unless defined otherwise, all technical and scientific terms used herein generally have the same meaning as commonly understood by one of ordinary skill in the art to which this invention belongs. Generally, the nomenclature used herein and the laboratory procedures in cell culture, molecular genetics, organic chemistry, and nucleic acid chemistry and hybridization described below are those well known and commonly employed in the art. Standard techniques are used for nucleic acid and peptide synthesis. The techniques and procedures are generally performed according to conventional methods in the art and various general references (see generally, Sambrook et al. MOLECULAR CLONING: A LABORATORY MANUAL, 2d ed. (1989) Cold Spring Harbor Laboratory Press, Cold Spring Harbor, N.Y., which is incorporated herein by reference), which are provided throughout this document. The nomenclature used herein and the laboratory procedures in analytical chemistry, and organic synthetic described below are those well known and commonly employed in the art. Standard techniques, or modifications thereof, are used for chemical syntheses and chemical analyses.

As used herein, "nucleic acid" means DNA, RNA, single-stranded, double-stranded, or more highly aggregated hybridization motifs, and any chemical modifications thereof. Modifications include, but are not limited to, those providing chemical groups that incorporate additional charge, polarizability, hydrogen bonding, electrostatic interaction, points of attachment and functionality to the nucleic acid ligand bases or to the nucleic acid ligand as a whole. Such modifications include, but are not limited to, peptide nucleic acids (PNAs), phosphodiester group modifications (e.g., phosphorothioates, methylphosphonates), 2'-position sugar modifications, 5-position pyrimidine modifications, 8-position purine modifications, modifications at exocyclic amines, substitution of 4-thiouridine, substitution of 5-bromo or 5-iodo-uracil; backbone modifications, methylations, unusual base-pairing combinations such as the isobases, isocytidine and isoguanidine and the like. Nucleic acids can also include non-natural bases, such as, for example, nitroindole. Modifications can also include 3' and 5' modifications such as capping with a fluorophore (e.g., quantum dot) or another moiety.

"Peptide" refers to a polymer in which the monomers are amino acids and are joined together through amide bonds, alternatively referred to as a "polypeptide." Unnatural amino acids, for example, β-alanine, phenylglycine and homoarginine are also included under this definition. Amino acids that are not gene-encoded may also be used in the present invention. Furthermore, amino acids that have been modified to include reactive groups may also be used in the invention. All of the amino acids used in the present invention may be either the D- or L-isomer. The L-isomers are generally preferred. In addition, other peptidomimetics are also useful in the present invention. For a general review, see, Spatola, A. F., in CHEMISTRY AND BIOCHEMISTRY OF AMINO ACIDS, PEPTIDES AND PROTEINS, B. Weinstein, eds., Marcel Dekker, New York, p. 267 (1983).

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an a carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. "Amino acid mimetics" refers to chemical compounds that have a structure that is different from the general chemical structure of an amino acid, but that functions in a manner similar to a naturally occurring amino acid.

"Antibody" refers to a polypeptide ligand substantially encoded by an immunoglobulin gene or immunoglobulin genes, or fragments thereof, which specifically binds and recognizes an epitope (e.g., an antigen). The recognized immunoglobulin genes include the kappa and lambda light chain constant region genes, the alpha, gamma, delta, epsilon and mu heavy chain constant region genes, and the myriad immunoglobulin variable region genes. Antibodies exist, e.g., as intact immunoglobulins or as a number of well characterized fragments produced by digestion with various peptidases. This includes, e.g., Fab' and $F(ab)'_2$ fragments. The term "antibody," as used herein, also includes antibody fragments either produced by the modification of whole antibodies or those synthesized de novo using recombinant DNA methodologies. It also includes polyclonal antibodies, monoclonal antibodies, chimeric antibodies, humanized antibodies, or single chain antibodies. The "Fc" portion of an antibody refers to that portion of an immunoglobulin heavy chain that comprises one or more heavy chain constant region domains, CH1, CH2 and CH3, but does not include the heavy chain variable region.

As used herein, an "immunoconjugate" means any molecule or ligand such as an antibody or growth factor (i.e., hormone) chemically or biologically linked to a fluorophore, a cytotoxin, an anti-tumor drug, a therapeutic agent or the like. Examples of immunoconjugates include immunotoxins and antibody conjugates.

Where substituent groups are specified by their conventional chemical formulae, written from left to right, they equally encompass the chemically identical substituents which would result from writing the structure from right to left, e.g., $—CH_2O—$ is intended to also recite $—OCH_2—$; $—NHS(O)_2—$ is also intended to represent. $—S(O)_2HN—$, etc.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups, which are limited to hydrocarbon groups are termed "homoalkyl".

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, $—CH_2—CH_2—O—CH_3$, $—CH_2—CH_2—NH—CH_3$, $—CH_2—CH_2—N(CH_3)—CH_3$, $—CH_2—S—CH_2—CH_3$, $—CH_2—CH_2,—S(O)—CH_3$, $—CH_2—CH_2—S(O)_2—CH_3$, $—CH=CH—O—CH_3$, $—Si(CH_3)_3$, $—CH_2—CH=N—OCH_3$, and $—CH=CH—N(CH_3)—CH_3$. Up to two heteroatoms may be consecutive, such as, for example, $—CH_2—NH—OCH_3$ and $—CH_2—O—Si(CH_3)_3$. Similarly, the term "heteroalkylene" by itself or as part of another substituent means a divalent radical derived from heteroalkyl, as exemplified, but not limited by, $—CH_2—CH_2—S—CH_2—CH_2—$ and $—CH_2—S—CH_2—CH_2—NH—CH_2—$. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula $—C(O)_2R'—$ represents both $—C(O)_2R'—$ and $—R'C(O)_2—$.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to: $—OR'$, $=O$, $=NR'$, $=N—OR'$, $—NR'R''$, $—SR'$, -halogen, $—SiR'R''R'''$, $—OC(O)R'$, $—C(O)R'$, $—CO_2R'$, $—CONR'R''$, $—OC(O)NR'R''$, $—NR''C(O)R'$, $—NR'—C(O)NR''R'''$, $—NR''C(O)_2R'$, $—NR—C(NR'R''R''')=NR''''$, $—NR—C(NR'R'')=NR'''$, $—S(O)R'$, $—S(O)_2R'$, $—S(O)_2NR'R''$, $—NRSO_2R'$, $—CN$ and $—NO_2$ in a number ranging from zero to (2m'+1), where m' is the total number of carbon atoms in such radical. R', R'', R''' and R'''' each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R'', R''' and R'''' groups when more than one of these groups is present. When R' and R'' are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

Each of the above terms are meant to include both substituted and unsubstituted forms of the indicated radical.

As used herein, the term "heteroatom" is meant to include oxygen (O), nitrogen (N), sulfur (S) and silicon (Si).

"Target," and "target species, as utilized herein refers to the species of interest in an assay mixture. Exemplary targets include, but are not limited to cells and portions thereof, enzymes, antibodies and other biomolecules, drugs, pesticides, herbicides, agents of war and other bioactive agents.

The term "substance to be assayed" as used herein means a substance, which is detected qualitatively or quantitatively by the process or the device of the present invention. Examples of such substances include antibodies, antibody fragments, antigens, polypeptides, glycoproteins, polysaccharides, complex glycolipids, nucleic acids, effector molecules, receptor molecules, enzymes, inhibitors and the like. The term "substance" can be used interchangeably with "sample" and "sample molecules". For example, such substances include, but are not limited to, tumor markers such as α-fetoprotein, carcinoembryonic antigen (CEA), CA 125, CA 19-9 and the like; various proteins, glycoproteins and complex glycolipids such as $\beta_2$-microglobulin ($\beta_2$ m), ferritin and the like; various hormones such as estradiol ($E_2$), estriol ($E_3$), human chorionic gonadotropin (hCG), luteinizing hormone (LH), human placental lactogen (hPL) and the like; various virus-related antigens and virus-related antibody molecules such as HBs antigen, anti-HBs antibody, HBc antigen, anti-HBc antibody, anti-HCV antibody, anti-HIV antibody and the like; various allergens and their corresponding IgE antibody molecules; narcotic drugs and medical drugs and metabolic products thereof, and nucleic acids having virus- and tumor-related polynucleotide sequences.

The term, "assay mixture," refers to a mixture that includes the target and other components. The other components are, for example, diluents, buffers, detergents, and contaminating species, debris and the like that are found mixed with the target. Illustrative examples include urine, sera, blood plasma, total blood, saliva, tear fluid, cerebrospinal fluid, secretory fluids from nipples and the like. Also included are solid, gel or sol substances such as mucus, body tissues, cells and the like suspended or dissolved in liquid materials such as buffers, extractants, solvents and the like.

The term "drug" or "pharmaceutical agent," refers to bioactive compounds that cause an effect in a biological organism. Drugs used as affinity moieties or targets can be neutral or in their salt forms. Moreover, the compounds can be used in the present method in a prodrug form. Prodrugs are those compounds that readily undergo chemical changes under physiological conditions to provide the compounds of interest in the present invention.

The term "binding functionality" as used herein means a moiety, which has an affinity for a certain substance such as a "substance to be assayed," that is, a moiety capable of interacting with a specific substance to immobilize it on the chip of the invention. Binding functionalities can be chromatographic or biospecific. Chromatographic binding functionalities bind substances via charge-charge, hydrophilic-hydrophilic, hydrophobic-hydrophobic, van der Waals interactions and combinations thereof. Biospecific binding functionalities generally involve complementary 3-dimensional structures involving one or more of the above interactions. Examples of combinations of biospecific interactions include, but are not limited to, antigens with corresponding antibody molecules, a nucleic acid sequence with its complementary sequence, effector molecules with receptor molecules, enzymes with inhibitors, sugar chain-containing compounds with lectins, an antibody molecule with another antibody molecule specific for the former antibody, receptor molecules with corresponding antibody molecules and the like combinations. Other examples of the specific binding substances include a chemically biotin-modified antibody molecule or polynucleotide with avidin, an avidin-bound antibody molecule with biotin and the like combinations.

"Adsorbent" refers to any material capable of adsorbing an analyte. The term "adsorbent" is used herein to refer both to a single material ("monoplex adsorbent") (e.g., a compound or functional group) to which the analyte is exposed, and to a plurality of different materials ("multiplex adsorbent") to which a sample is exposed. The adsorbent materials in a multiplex adsorbent are referred to as "adsorbent species." For example, an addressable location on a substrate can comprise a multiplex adsorbent characterized by many different adsorbent species (e.g., anion exchange materials, metal chelators, or antibodies), having different binding characteristics.

The term "adsorbent film" as used herein means an area where a substance to be assayed is immobilized and a specific binding reaction occurs having a distribution along the flow direction of a test sample.

"Adsorb" refers to the detectable binding between an absorbent and an analyte either before or after washing with an eluant (selectivity threshold modifier).

As used herein, the terms "polymer" and "polymers" include "copolymer" and "copolymers," and are used interchangeably with the terms "oligomer" and "oligomers."

The term "detection means" as used herein refers to detecting a signal produced by the immobilization of the substance to be assayed onto the binding layer by visual judgment or by using an appropriate external measuring instrument depending on the signal properties.

The term "attached," as used herein encompasses interaction including, but not limited to, covalent bonding, ionic bonding, chemisorption, physisorption and combinations thereof.

The term "independently selected" is used herein to indicate that the groups so described can be identical or different.

The term "biomolecule" or "bioorganic molecule" refers to an organic molecule typically made by living organisms. This includes, for example, molecules comprising nucleotides, amino acids, sugars, fatty acids, steroids, nucleic acids, polypeptides, peptides, peptide fragments, carbohydrates, lipids, and combinations of these (e.g., glycoproteins, ribonucleoproteins, lipoproteins, or the like).

The term "sample" refers to any material which may be analyzed using methods described herein. The term sample encompasses biological materials, which comprise any material derived from an organism, organ, tissue, cell or virus. This includes biological fluids such as saliva, blood, urine, lymphatic fluid, prostatic or seminal fluid, milk, etc., as well as extracts of any of these, e.g., cell extracts, cell culture media, fractionated samples, or the like.

The term "sample molecule" refers to a component of a sample which is desirably retained and detected. The term can refer to a single component or a set of components in the sample. “Sample molecule” is used interchangeably with the term “analyte”.

Overview

The present invention provides methods and compositions for detecting and analyzing molecules in a sample. In one aspect, the invention utilizes mass spectrometry methods to detect and analyze the spatial arrangement of molecules in a sample. It will be appreciated that analysis of the spatial arrangement of molecules in a sample provides information that can be applied to a variety of applications, including without limitation: detection of biomarkers, study of the entry of contaminants into a system, identification of drug targets, study of molecular compartmentalization within a tissue or cell, identification of metabolic intermediates and their distribution in a sample, and the like.

In one aspect, the invention provides methods and compositions for generating a “molecular print” of a sample. As used herein, a “molecular print” refers to sample material transferred to a surface. As discussed further herein, in some embodiments, molecular prints of the invention retain the spatial arrangement of molecules in the sample; such molecular prints are also referred to herein as “spatially oriented molecular prints”. In other embodiments, molecular prints of the invention do not retain the spatial orientation of the molecules within the sample; such molecular prints are also referred to herein as “non-spatially oriented molecular prints”. Unless otherwise noted, the term “molecular print” as used herein encompasses both spatially oriented and non-spatially oriented molecular prints.

In an exemplary embodiment, molecular prints are generated using surfaces comprising affinity reagents that selectively retain certain molecules from the sample. For example, a surface comprising binding functionalities capable of interacting with a specific protein will retain those proteins from the sample, thus forming a molecular print comprising those proteins. In some embodiments, the sample is transferred to the surface such that the spatial distribution of those proteins in the sample is reflected in their distribution on the surface.

In one aspect, the invention provides methods for measuring complex mass spectra from multiple locations on a molecular print generated from a sample. These mass spectra can be used to detect and quantify the molecules present in these locations. Since the molecular print reflects the original spatial arrangement of the sample molecules, the mass spectra measured according to the invention provides information on the identity and the quantity of sample molecules and their distribution in the original sample. Such information is particularly useful in detecting and analysis of molecules of interest, such as biomarkers of disease and drug targets. In one exemplary embodiment, the mass spectrometry methods used to analyze molecular prints according to the invention are laser desorption mass spectrometry methods such as MALDI and SELDI-TOF-MS.

Analysis of molecular prints of the invention enables correlation of molecular spectra with morphological and clinical features of a sample. Since clinical specimens are inherently heterogeneous, using different desorption substrates for different specimens can generate marker profiles comprising a greater number and more complex data points than is possible using conventional methods. In certain aspects, the present invention provides two-dimensional maps of proteins, peptides or drug molecules in human tissue and tumors using a minimum amount of specimen. The present invention also provides methods and compositions for conducting molecular investigations on the same (rather than adjacent) tissue sections for histological analysis. Methods and compositions of the invention result in “tissue-less” profiling of tissues through the detection of molecules captured onto, and desorbed from, identical substrates.

Molecular Printing

The present invention provides molecular prints and methods for generating molecular prints. As described herein, molecular prints are generating by transferring a sample to a surface. In some embodiments, the sample is transferred to the surface such that the spatial arrangement of molecules within the sample is maintained (spatially oriented molecular prints), while in other embodiments the spatial arrangement of the molecules is not maintained (non-spatially oriented molecular prints). Molecular prints of the invention encompass prints generated by direct transfer of a sample or molecules from a sample to a surface. In some embodiments, the surface comprises materials that capture molecules from the sample. In further embodiments, the surface comprises an adsorbent film.

An advantage provided by molecular prints of the invention is that a sample can be transferred to a surface directly, with minimal to no further processing, such that molecules are not lost from the sample. For example, in conventional methods of transferring a sample to a surface such as a SELDI chip, certain molecules (such as highly hydrophobic membrane proteins) are generally lost during processing and never make it to the surface. In contrast, the present invention can, through the use of adsorbents or other means of capturing molecules on a surface, provide quantitative information on multiple molecules in a sample through design of the surface as described herein.

FIG. 1 is a schematic illustration of one aspect of the invention. In a first step, a sample is placed on a surface (FIG. 1A). In one embodiment, such a surface is a ProteinChip Array, such as a H50 or CM10 chip (Bio-Rad Laboratories, Inc.). In such an embodiment, molecules from the sample bind to chemical or biological sites on the ProteinChip surface. Such chemical or biological sites can include reactive functionalities, binding functionalities, antibodies, as well as any other capture molecules known in the art and described herein. In general, biological species in the sample at the contact interface between the sample and the surface are transferred to the surface, and the chemical or biological sites on the surface can be used to maintain spatial orientation through affinity binding.

In a second step, unbound sample molecules are removed from the surface (FIG. 1B). In embodiments utilizing a ProteinChip, unbound proteins can be removed using a buffer of an appropriate stringency. Proteins bound to the surface are retained in a spatial fashion.

In a third step (FIG. 1C), transferred molecules are detected using methods such as SELDI-TOF-MS. In one embodiment, an energy absorbing matrix is added to the sample prior to the detection step. In another embodiment, the chip surface comprises a photoreactive polymer that is able to absorb photo-irradiation from a fluence source and transfer that energy to the sample molecules to desorb and ionize the retained molecules for detection, as described further herein.

In one aspect, a sample is transferred to a surface such that the spatial arrangement of molecules in the sample is maintained. In an exemplary embodiment, the surface comprises an adsorbent film. In a still further embodiment, transferring the sample to the surface comprises adsorbing molecules from the sample to the surface or to an adsorbent film on that surface.

In an exemplary embodiment, a sample is transferred to a surface comprising an adsorbent film, and the adsorbent film comprises affinity reagents which retain specific molecules from the sample. In accordance with the invention, the transfer of the sample (and thus the retention of specific molecules by the affinity reagents) is accomplished in such a way that the spatial arrangement of these sample molecules is maintained. In a further embodiment, sample molecules that are not adsorbed to the surface are removed. In an exemplary embodiment, the non-adsorbed molecules are washed from the surface. Such a washing step can be carried out using a variety of techniques known in the art and described herein, for example by bathing, soaking, or dipping the substrate having the adsorbent and sample bound thereon in an eluant; or by rinsing, spraying, or washing over the substrate with the eluant. The introduction of eluant to small diameter spots of affinity reagent can also be achieved by microfluidics processes well known and described in the art. An advantage provided by molecular prints of the present invention is that surfaces comprising adsorbent films (or other functionalities as described herein) are able to retain the spatial arrangement of the sample molecules captured on those surfaces even during one or more wash steps.

In a still further embodiment, sample molecules adsorbed onto a surface comprising an adsorbent film will form a test surface. In a still further embodiment, an energy absorbing matrix is added to the test surface. Energy absorbing matrixes suitable for this purpose are known in the art and can including without limitation SPA and CHCA. The energy absorbing matrix is generally selected to absorb energy from a high fluence source, such as a laser, and then impart that energy to the analyte (i.e., the sample and/or the sample molecules), resulting in desorption and ionization. The type of matrix used can affect the spectra generated from a molecular print on a particular surface (e.g., compare top and bottom traces in FIG. 15 and FIG. 16). The spectra generated from molecular prints of the present invention can thus be optimized through the selection of parameters such as energy absorbing matrixes used.

Figure 17:
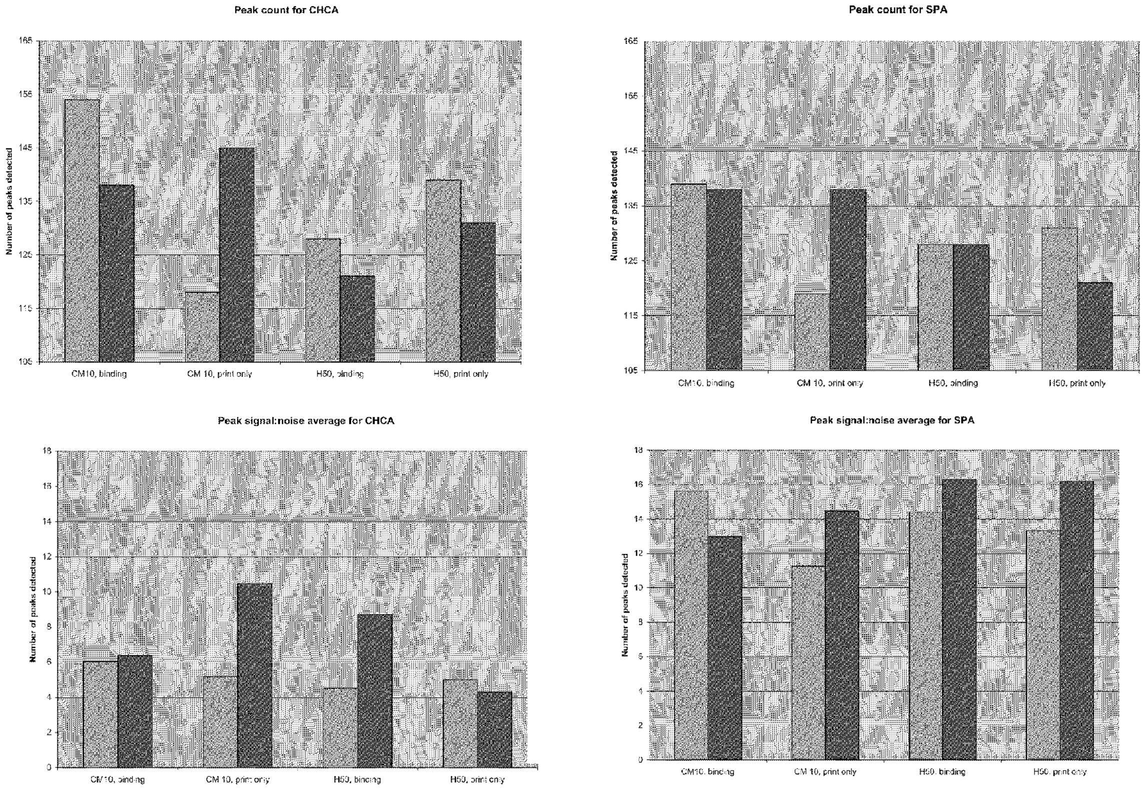
FIG. 17 shows data on peak count and peak signal to noise averages for different substrates under different conditions.
Figure 18:
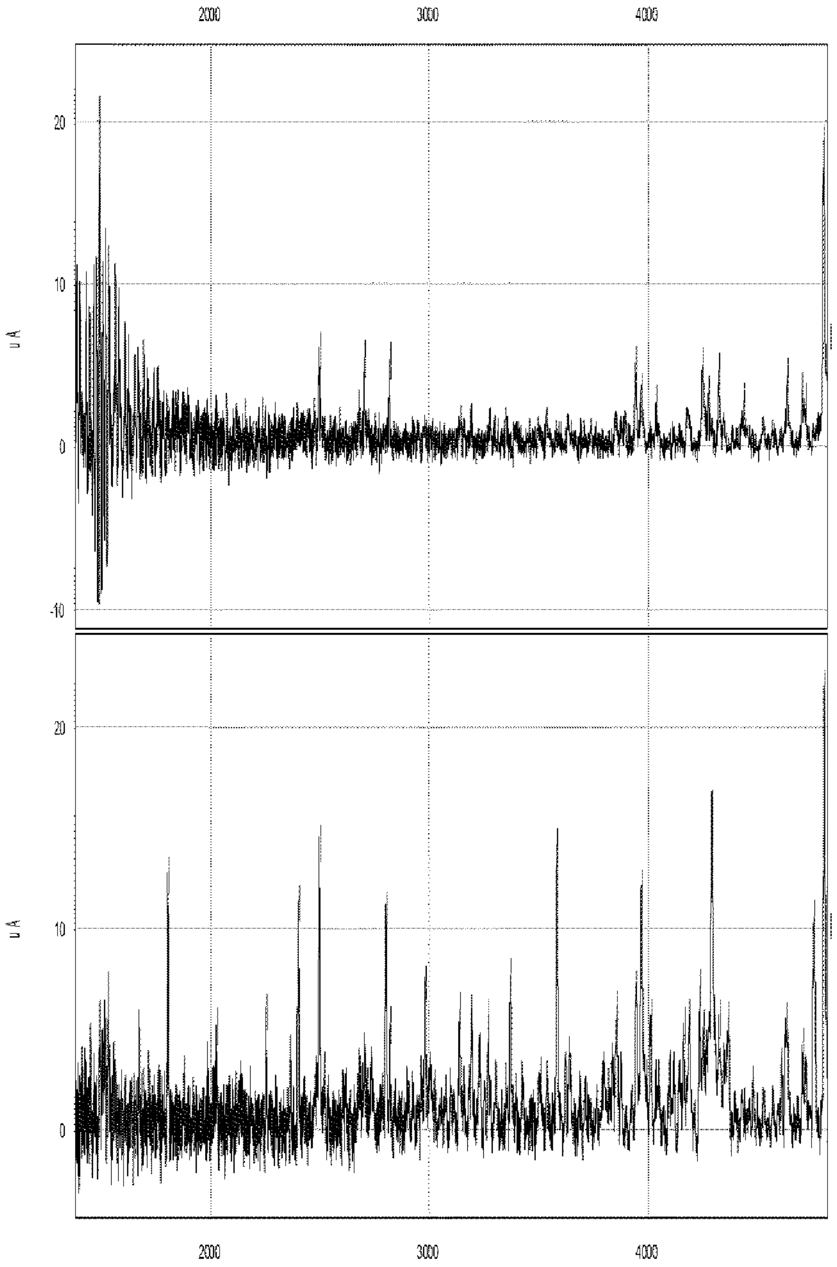
FIG. 18 compares spectra from H50 (top trace) and CM10 (bottom trace) chips.
Figure 19:
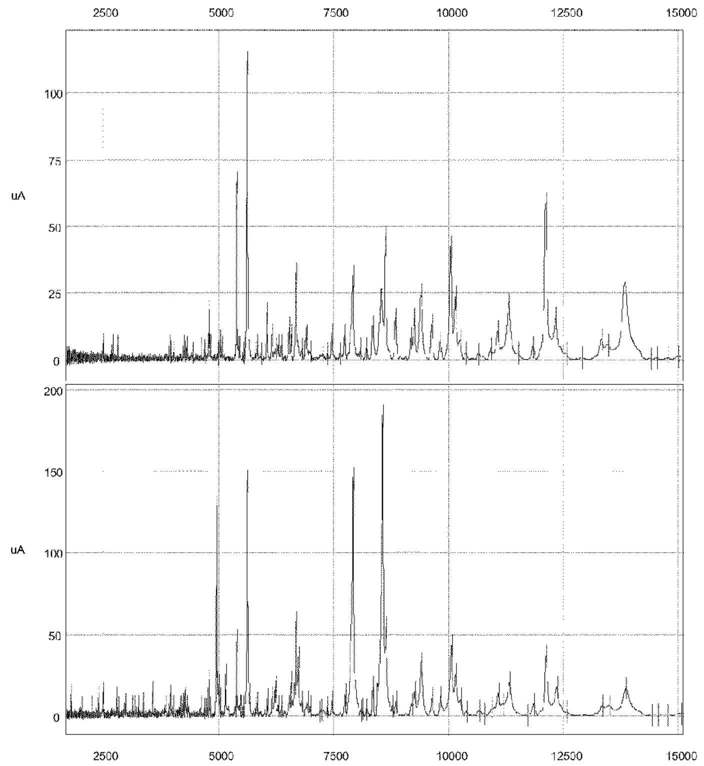
FIG. 19 compares spectra from H50 (top traces) and CM10 (bottom traces) chips.
Figure 19:
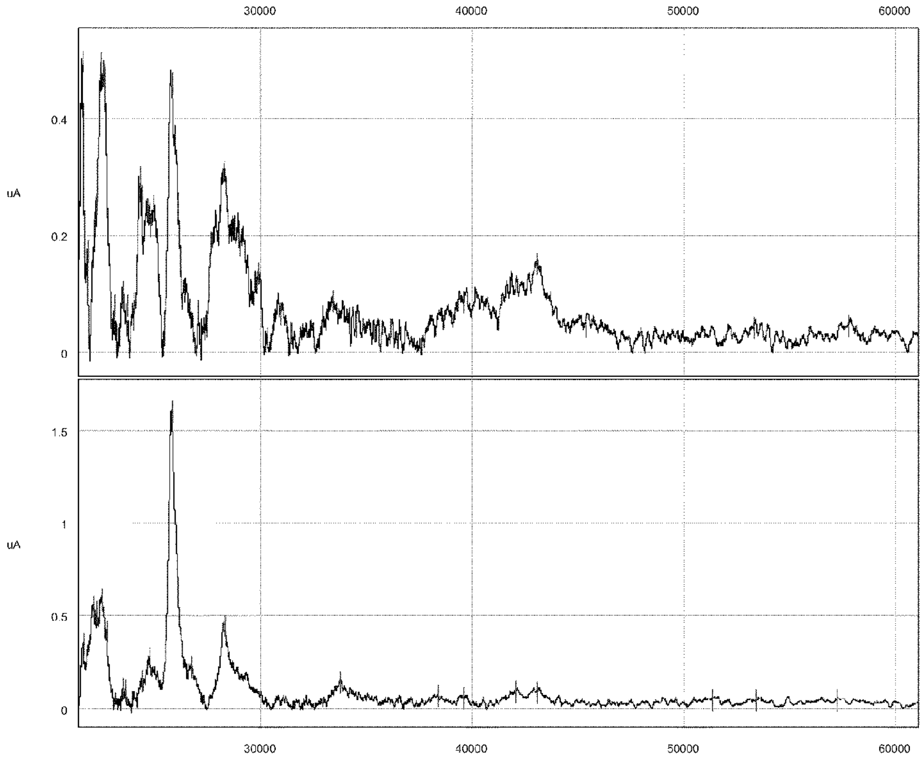

Molecular prints of the invention can be further optimized for data quality and quantity. For example, as shown in FIG. 17, using different surfaces with and without binding buffers and energy absorbing matrixes can affect peak count and peak signal to noise averages. The two bars for each combination in FIG. 17 are data with a wash (right bar) and with no wash (left bar). In addition, the type of surface used can affect the number and quality of peaks generated from a molecular print. See for example FIG. 18 and FIG. 19, which compare spectra from H50 (top traces) and CM10 (bottom traces) chips. Thus, the choice of surface, energy absorbing matrix, and binding buffer can be used to fine-tune data obtained from molecular prints of the invention.

The sample may be contacted to the adsorbent either before or after the adsorbent is positioned on a substrate. The sample may be contacted to the adsorbent using any suitable method which will enable binding between sample molecules and the adsorbent.

The sample should be contacted to the adsorbent for a period of time sufficient to allow sample molecules to bind to the adsorbent. In an exemplary embodiment, the sample is contacted with the analyte for a period of between about 20 seconds and about 12 hours, between about 20 seconds and about 5 hours, between about 30 seconds and about 2 hours, between about 40 seconds and about 1 hour, and between about 1 minute and 15 minutes.

Figure 22:
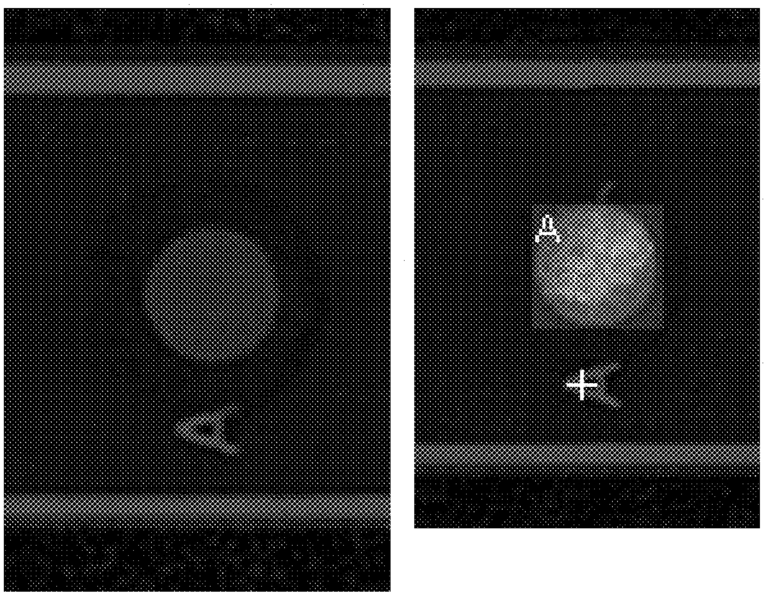
FIG. 22 shows spectra from two different incubation times.
Figure 22:
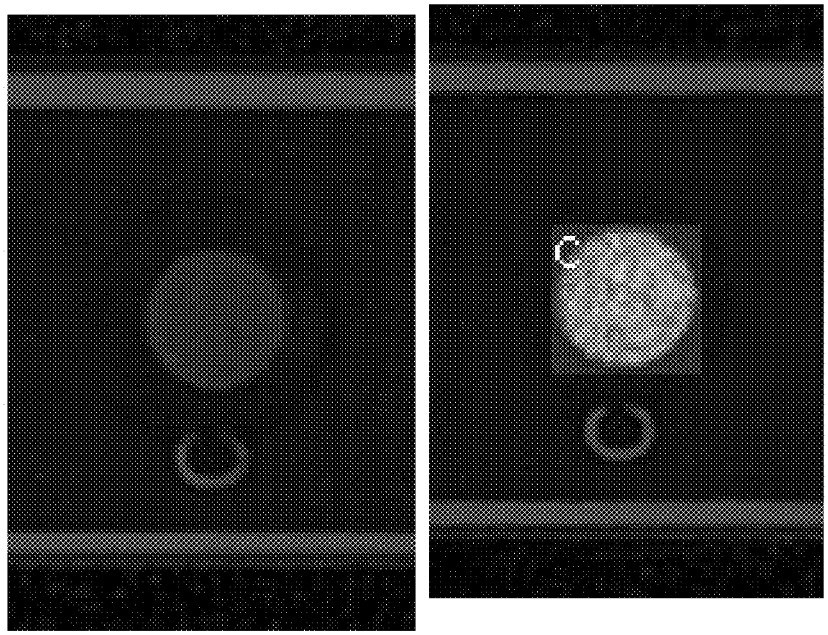

The amount of time that a sample is transferred to a surface can affect the quality of the resultant spectra and can also affect the number of different molecular species that are isolated from a sample. In particular, for smaller volume samples, a longer transfer time can help isolate more species. However, a smaller transfer time may be of use in certain situations, for example for in vivo uses in which longer transfer times are not possible. FIG. 22A shows that spectra can be obtained from a five-minute incubation with good spatial resolution. However, as shown in FIG. 22B, which shows spectra from a one-hour incubation, more molecules can be isolated when the sample is transferred to a surface over a longer period of time. For the spectra in FIGS. 22A and 22B, both surfaces were pre-wet and washed prior to detection, and SPA was added as a matrix.

The temperature at which a sample is contacted to an adsorbent can be a function of the particular sample and adsorbents selected. In one embodiment, the sample is contacted to the adsorbent under ambient temperature and pressure conditions, however, for some samples, modified temperatures from about 4° C. to about 37° C. are desirable. Temperature and pressure conditions will be readily determinable by those skilled in the art.

In an exemplary aspect, the samples used to generate molecular prints of the invention are wet samples. Such samples may be inherently wet, or the samples may be wet from a perfusion treatment or from liquid added for the transfer process.

To assist in the transfer of sample molecules to a substrate, a material may be applied to the sample before, after or simultaneously with contacting the sample to the substrate. In an exemplary embodiment, the material applied to the sample to assist in the transfer of sample molecules to a substrate is a liquid. In a further embodiment, the liquid is a solvent, including without limitation water or ethanol. In another embodiment, the liquid is a buffer. In a still further embodiment, the buffer comprises a binding agent. The material used to assist in transfer of sample molecules to a substrate may also comprise a combination of the above described embodiments as well as other materials known in the art to aid in the transfer of molecules from a sample to a substrate.

The following discussion describes different kinds of samples that can be used to generate molecular prints according to the invention. It will be appreciated that the invention is not limited to these exemplary embodiments.

Prints from Tissue

In one exemplary embodiment, tissue isolated from an organism using methods known in the art is transferred to a surface to form a molecular print of the tissue. Molecules from tissues can also be eluted onto a surface such that the spatial arrangement is or is not retained. As will be appreciated, both spatially oriented and non-spatially oriented molecular prints can be used with detection methods known in the art and described herein to identify and quantify the molecules present in the tissue area presented.

Tissues used to produce molecular prints of the invention can include without limitation epithelium, connective tissue (including bone and blood), muscle tissue (including smooth muscle, skeletal muscle and cardiac muscle) and nervous tissue (including tissue forming the brain, spinal cord and peripheral nervous system). Tissues used in accordance with the invention include whole organs, whole tissues, pieces of tissue, and slices of tissue. As will be appreciated, the term tissue refers to any part of an organism comprising an aggregate of cells having a similar structure and function.

Figure 23:
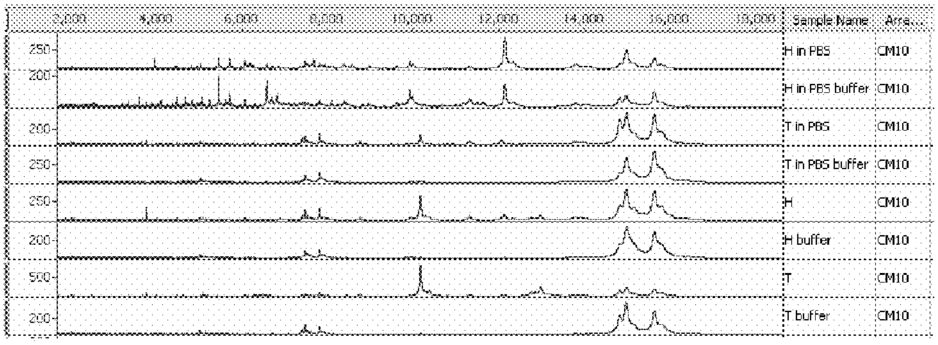
FIG. 23 shows spectra from raw healthy tissue (designated with an "H") and raw tumor tissue (designated with a "T") under different buffer conditions on three different surfaces.
Figure 23:
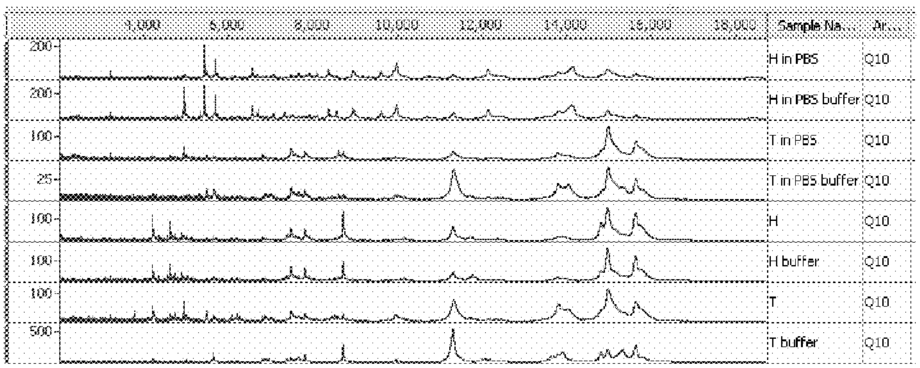
Figure 23:
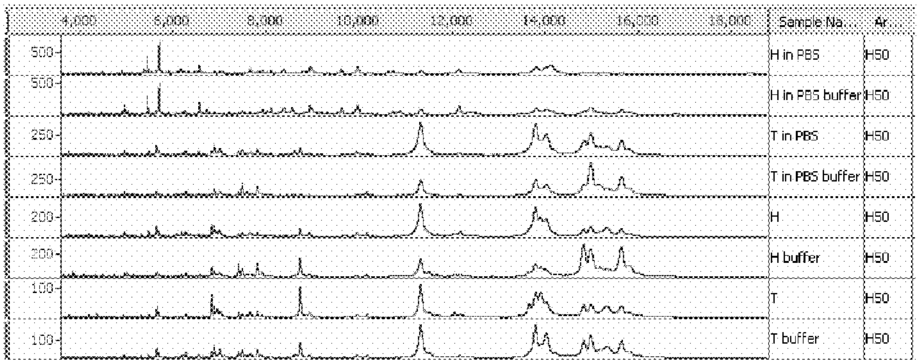

In an exemplary embodiment, prints are made according to the invention from tissue containing one or more tumors. In a further embodiment, spectra from prints made from tissue comprising tumors are compared to prints made from healthy tissue to identify molecules that may be biomarkers of disease. For example, FIG. 23 shows spectra from raw healthy tissue (designated with an H) and raw tumor tissue (designated with a T) from molecular prints on three different kinds of surfaces—CM10 chip in FIG. 23A, Q10 chip in FIG. 23B and H50 chip in FIG. 23C. These molecular prints were produced by applying the tissue to the surface for three hours in PBS to remove the blood—no further sample preparation was conducted. As is apparent from the data in FIG. 23, complex spectra can be obtained from the different types of tissue and compared to identify molecules that may be markers of disease.

In one aspect, the molecular printing methods of the present invention provides a simple and efficient methodology for the investigation and cleanup of proximal tissue samples, such as cultured cell lines and tissues, in which material is transferred directly from the sample to the surface. These methods allow the transfer of molecules from tissue without requiring processing of the tissue, which can result in the loss of certain molecules. For example, membrane proteins, which are heavily hydrophobic, often are not retained in conventional methods of preparing samples for transfer to a surface for investigation using detecting methods such as mass spectrometry. In an exemplary aspect, molecular prints are made from a tissue of interest onto a surface, such as a surface for use in SELDI detection methods, in the presence of a binding buffer. The sample molecules that are not captured by the surface are removed, and the surface can then be used in a detection method, such as SELDI. In further embodiments, a matrix is added prior to detection. In still further embodiments, the surface comprises capture elements, such as those described herein for chromatographic or immunoprinting methods, to selectively capture certain molecules from the sample.

In one exemplary embodiment, tissues are first washed with a physiological buffer (such as PBS) to remove residual blood and/or serum contaminant proteins. The tissues may be sliced suing a cyrotome, and thin slices of tissue placed on a surface, such as a ProteinChip array (BioRad Laboratories, Inc.). The array comprising the tissue slice(s) can be placed into a humid chamber and stored overnight or air-dried overnight at room temperature. Once the chip is fully dried, an energy absorbing matrix such as SPA can be applied to the surface and allowed to dry. The chip can then be analyzed using a mass spectrometry system, such as a PCS Mass Spectrometry System using Full Surface Scan software, or Ciphergen Express Software if the target area is contained within an eight spot format target area.

In a further exemplary embodiment, spatially resolved tissue prints are generated by applying a thin slice of tissue to a surface suitable for SELDI analysis. In some embodiment, the surface is first pre-wet with PBS and allowed to equilibrate at ambient temperature. The PBS is removed prior to application of the tissue slice. A low stringency buffer can then be applied such that the entire exposed surface is engulfed in buffer. Binding buffer is not necessary in all embodiments, but can be used to facilitate the transfer and result in more intense peaks. The chip can then be placed into a humid chamber and stored overnight at 4° C. or stored at room temperature for about 30 minutes to about 2 hours. After this incubation, the tissue can then be removed using vacuum aspiration or tweezers. The molecules remaining on the chip surface form the molecular print of the tissue. In further embodiments, the molecular print may be further processed by washing in de-ionized water and/or micromixing the sample using parameters known in the art and described herein (see Examples). In still further embodiments, an energy absorbing matrix is applied to the chip prior to detection using methods such as SELDI.

Prints from Gels

In one exemplary embodiment, molecular prints or the invention are generated from gels. In such an embodiment, bands from a gel can be eluted onto a surface such that the spatial arrangement of the molecules within the band is maintained. Bands from a gel can also be eluted onto a surface such that the spatial arrangement is not retained. As will be appreciated, both spatially oriented and non-spatially oriented molecular prints can be used to identify and quantify molecules according to the present invention. Gels that can be used in accordance with the invention are well known in the art. Elution of bands from a gel is a technique well known and characterized in the art. (see generally, Sambrook et al. Molecular Cloning: A Laboratory Manual, 2d ed. (1989) Cold Spring Harbor Laboratory Press, Cold Spring Harbor, N.Y., which is incorporated herein by reference in its entirety for all purposes and in particular for all teachings related to gels and elution of bands from gels).

In an exemplary embodiment, gels containing fluorescent tagged proteins are applied to a surface in a thin slice. An excess of a low stringency buffer is then applied to the surface and allowed to equilibrate at ambient temperature, generally for about five to ten minutes. The low stringency buffer is then removed by vacuum aspiration. Another strip of gel from a different area can then be applied in a similar manner to another part of the surface. In some embodiments, a binding buffer is applied such that the entire exposed surface is engulfed in buffer; or in some embodiments, a transfer buffer is applied to the gel. The surface comprising the gel can then be placed in a humid chamber and stored overnight at 4° C. or incubated for about an hour at room temperature. The gel can then be removed using vacuum aspiration or mechanical removal (i.e., using tweezers), and the molecules remaining behind on the surface form the molecular print of the gel. Further processing involving washes and/or de-salting steps can then be used to help optimize data generated from the prints using detection methods such as SELDI. In some embodiments, an energy absorbing matrix such as SPA is applied to the print prior to detection.

Immunoprints

In one exemplary embodiment, the present invention provides methods and compositions for generating immunoprints of samples. The term “immunoprint” refers to a molecular print of the invention that is produced using surfaces comprising molecules which selectively capture biological molecules from a sample. For example, antibodies and/or fragments of antibodies can be immobilized on a surface, and these antibodies and/or antibody fragments selectively capture certain proteins from a sample which contain epitopes that are complementary to those antibodies or antibody fragments.

Figure 24:
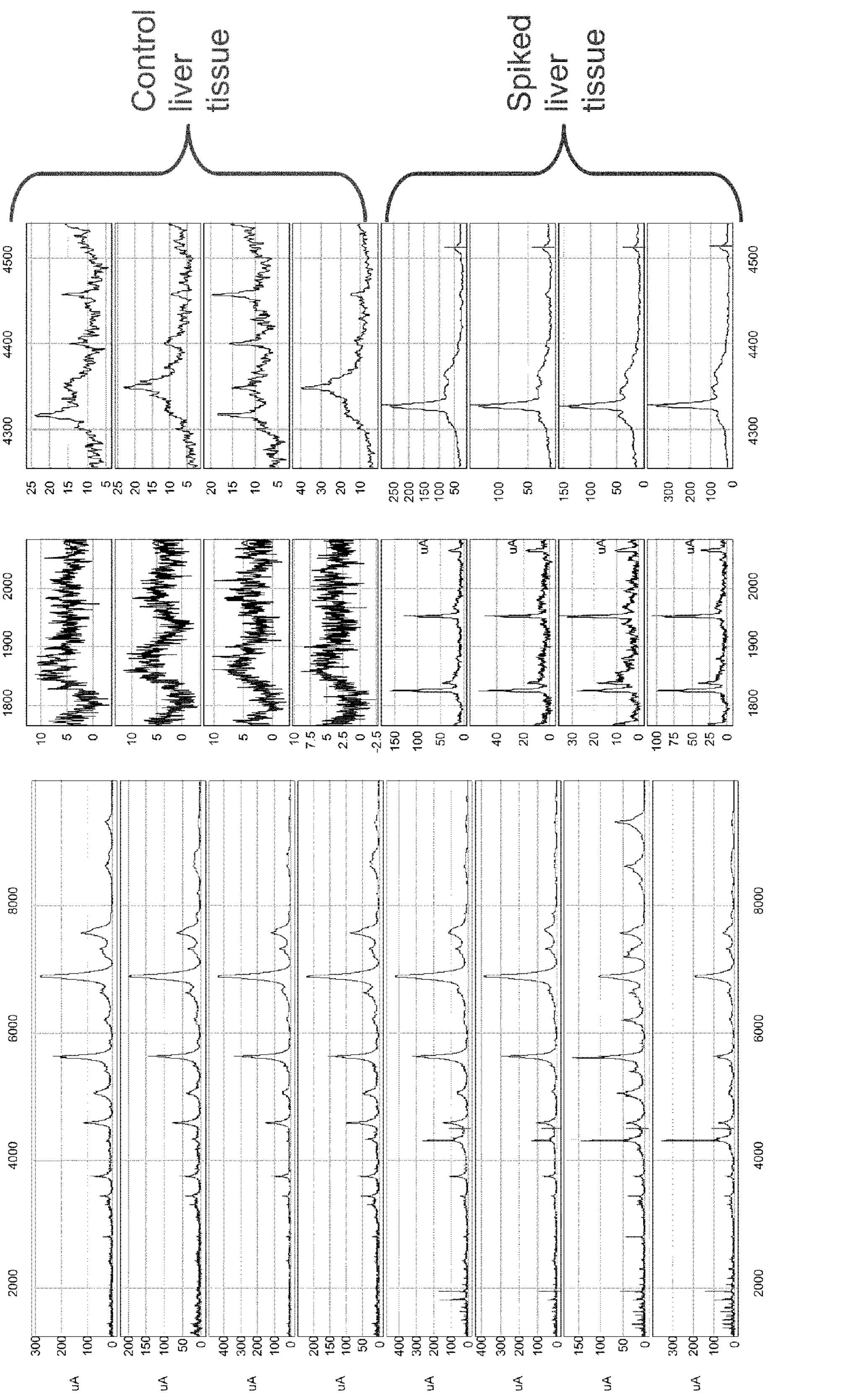
FIG. 24 shows spectra from immunoprints from control and spiked liver tissue. The spiked liver tissue contains beta-amyloid.

In one exemplary embodiment, antibodies and/or antibody fragments selective for the beta-amyloid protein could be immobilized on a surface. A sample of an organ, such as a brain, that is transferred to such a surface could then create an immunoprint that can be used to locate where in the organ beta-amyloid plaques are located. Data from such immunoprints are shown in FIG. 24, in which the “spiked liver tissue” comprises beta-amyloid.

Similar techniques can be used to detect and analyze the spatial arrangement of any protein for which an antibody and/or antibody fragment is used as a capture molecule or moiety on a surface according to the present invention. Similar techniques can be used to detect and analyze the spatial arrangement of any protein for which a coupling protein, peptide, or protein fragment or peptode fragment is used as a capture molecule or moiety on a surface according to the present invention. Similar techniques can be used to detect and analyze the spatial arrangement of any protein for which a selectively coupling molecule (natural or synthetic) is used as a capture molecule or moiety on a surface according to the present invention.

Cell Lysis Prints

In one exemplary embodiment, a molecular print is generated from a cell. In a further embodiment, the present invention provides methods and compositions for generating cell lysis prints of samples. In this aspect of the invention, a reactive surface can be used to simultaneously lyse cells and capture molecules from the lysate such that spatial information of the molecules is retained. In one exemplary embodiment, membrane proteins are selectively trapped from a membrane surface. In another embodiment, lysine is used to strip and lyse cells in a spatially-preserved manner from a tissue section. Other methods and compositions known in the art can be applied to generate cell lysis prints according to the present invention. Cell lysis prints may also be non-spatially oriented prints, and such prints may be formed from cells lysed on a surface or lysed prior to application of the cellular material to a surface.

It will be appreciated that cell lysis prints can be generated from a single cell or from multiple cells. It will also be appreciated that cell lysis prints can also be generated from parts of a cell, such as a cell membrane, organelles, cytoplasm, nucleus, and the like. It will also be appreciated that cell lysis prints can also be generated from groups of cells, forming areas of tissue.

Arrays

As discussed herein, molecular prints of the invention can be supported by, placed on or contained in a substrate having a surface. In certain exemplary embodiments, such substrates are part of arrays (also referred to herein as "chips"), particularly arrays used in mass spectrometry methods. Although the present invention is further explained and illustrated in the sections hereinbelow in reference to embodiments for using detection by mass spectrometry, the focus on mass spectrometric detection is for purposes of clarity and simplicity of illustration only, and should not be construed as limiting the scope of the present invention or circumscribing the types of methods in which the present invention finds application. Those of skill in the art will recognize that the methods set forth herein are broadly applicable to a number of substrate and chip formats and assays using such compositions for the detection of a wide range of target moieties.

The components of arrays of the invention are discussed in detail hereinbelow. Those of skill will appreciate that each of the described preferred and alternate embodiments of each of the components are readily combined with the embodiments of other components without limitation. Methods for creating such arrays and descriptions of the components of such chips are well known in the art, for example in U.S. Pat. No. 6,027,942, filed Jan. 17, 1997; U.S. Pat. No. 6,844,165, filed Dec. 21, 2000; U.S. Pat. No. 7,276,381, filed Dec. 20, 2002; U.S. Pat. No. 7,183,544, filed Dec. 14, 2004; U.S. Pat. No. 7,517,496, filed Jul. 21, 2001; and U.S. patent Ser. No. 10/197,115, filed Jul. 16, 2002; Ser. No. 10/289,185, filed Nov. 5, 2002; Ser. No. 10/965,092, filed Oct. 14, 2004; Ser. No. 11/058,330, filed Feb. 14, 2005; Ser. No. 11/057,880, filed Feb. 14, 2005; Ser. No. 11/682,655, filed Mar. 6, 2007; Ser. No. 10/412,679, filed Apr. 14, 2003; and Ser. No. 10/546,173, filed Oct. 24, 2006, each of which is hereby incorporated by reference in its entirety for all purposes and in particular for all teachings related to chips, particularly chips for use in mass spectrometry methods.

Substrates

In one aspect, samples are transferred to a substrate to form a molecular print. In an exemplary aspect, the invention provides substrates comprising chromatographic reagents. Such substrates allow the capture of specific molecules from a sample onto the substrate. In one embodiment, substrates of the invention are retentate chromatography substrates known in the art and further described herein. Such are described for example in U.S. Pat. No. 6,844,165, filed Dec. 21, 2000, which is hereby incorporated by reference in its entirety for all purposes and in particular for its teachings regarding such substrates and compositions comprising such substrates.

In one aspect, substrates of the invention take the form of a probe or any other sample presenting means that is insertable into a desorption detector. For example, the substrate can take the form of a strip or of a plate. In one non-limiting exemplary embodiment, a substrate of the invention may be in the form of a having an array of horizontal and vertical rows of adsorbents which form a regular geometric pattern such as a square, rectangle or circle.

In an exemplary aspect, substrates of use according to the invention are adapted for use with the detectors employed in the methods of the present invention for detecting the analyte bound to and retained by an adsorbent that is part of, supported by or attached to the substrate. In one embodiment, the substrate is removably insertable into a desorption detector where an energy source can strike the spot and desorb the analyte. The substrate can be suitable for mounting in a horizontally and/or vertically translatable carriage that horizontally and/or vertically moves the substrate to successively position each predetermined addressable location of adsorbent in a path for interrogation by the energy source and detection of the analyte bound thereto. The substrate can in a further exemplary aspect be in the form of a conventional mass spectrometry probe.

In one aspect, adsorbents are immobilized on the surface of a substrate, either directly or through a flexible linker that is intercalated between the substrate and the adsorbent film. The flexible linker is bound to the plane of the substrate surface, or it is bound to a feature of the substrate surface such as a raised (e.g., island) or depressed (e.g., a well, trough, etc.) feature.

Substrates useful in practicing the present invention can be made of any stable material, or combination of materials that are capable of binding or holding an adsorbent. Exemplary substrate materials include, but are not limited to, inorganic crystals, inorganic glasses, inorganic oxides, metals, organic polymers and combinations thereof. Inorganic glasses and crystals of use in the substrate include, but are not limited to, LiF, NaF, NaCl, KBr, KI, $CaF_2$, $MgF_2$, $HgF_2$, BN, $AsS_3$, ZnS, $Si_3N_4$ and the like. The crystals and glasses can be prepared by art standard techniques. See, for example, Goodman, Crystal Growth Theory and Techniques, Plenum Press, New York 1974. Alternatively, the crystals can be purchased commercially (e.g., Fischer Scientific). Inorganic oxides of use in the present invention include, but are not limited to, $Cs_2O$, $Mg(OH)_2$, $TiO_2$, $ZrO_2$, $CeO_2$, $Y_2O_3$, $Cr_2O_3$, $Fe_2O_3$, NiO, ZnO, $Al_2O_3$, $SiO_2$ (glass), quartz, $In_2O_3$, $SnO_2$, $PbO_2$ and the like. Metals of use in the substrates of the invention include, but are not limited to, gold, silver, platinum, palladium, nickel, copper and alloys and composites of these metals.

In a further embodiment, substrates used in accordance with the present invention can be configured to have any convenient geometry or combination of structural features. The substrates can be either rigid or flexible and can be either optically transparent or optically opaque. The substrates can also be electrical insulators, conductors or semiconductors. Further the substrates can be substantially impermeable to liquids, vapors and/or gases or, alternatively, the substrates can be substantially permeable to one or more of these classes of materials.

The materials forming the substrate can be utilized in a variety of physical forms such as films, supported powders, glasses, crystals and the like. For example, a substrate can consist of a single inorganic oxide or a composite of more than one inorganic oxide. When more than one component is used to form a substrate, the components can be assembled in, for example a layered structure (i.e., a second oxide deposited on a first oxide) or two or more components can be arranged in a contiguous non-layered structure. Further the substrates can be substantially impermeable to liquids, vapors and/or gases or, alternatively, the substrates can be permeable to one or more of these classes of materials. Moreover, one or more components can be admixed as particles of various sizes and deposited on a support, such as a glass, quartz or metal sheet. Further, a layer of one or more components can be intercalated between two other substrate layers (e.g., metal-oxide-metal, metal-oxide-crystal). Those of skill in the art are able to select an appropriately configured substrate, manufactured from an appropriate material for a particular application.

Further details regarding the composition and form of substrates useful in the present invention are well known in the art and are for example described in U.S. Pat. No. 6,027,942, filed Jan. 17, 1997; U.S. Pat. No. 6,844,165, filed Dec. 21, 2000; U.S. Pat. No. 7,276,381, filed Dec. 20, 2002; U.S. Pat. No. 7,183,544, filed Dec. 14, 2004; U.S. Pat. No. 7,517,496, filed Jul. 21, 2001; and U.S. patent Ser. No. 10/197,115, filed Jul. 16, 2002; Ser. No. 10/289,185, filed Nov. 5, 2002; Ser. No. 10/965,092, filed Oct. 14, 2004; Ser. No. 11/058,330, filed Feb. 14, 2005; Ser. No. 11/057,880, filed Feb. 14, 2005; Ser. No. 11/682,655, filed Mar. 6, 2007; Ser. No. 10/412,679, filed Apr. 14, 2003; and Ser. No. 10/546,173, filed Oct. 24, 2006, each of which is hereby incorporated by reference in its entirety for all purposes and in particular for all teachings related to substrate form, composition, and attachment of substrates to analytes and to adsorbents.

Adsorbent Layers

In one aspect, substrates of the invention hold or are attached to an adsorbent. As discussed herein, the term "adsorbent" can be used interchangeably with the terms "adsorbent layer" and "adsorbent film".

The adsorbent can be directly or indirectly coupled, fitted, or deposited on the substrate prior to contacting with the sample containing the analyte. The adsorbent may be directly or indirectly coupled to the substrate by any suitable means of attachment or immobilization. For example, the adsorbent can be directly coupled to the substrate by derivatizing the substrate with the adsorbent to directly bind the adsorbent to the substrate through covalent or non-covalent bonding. Methods and compositions for attaching adsorbents to a surface of a substrate are known in the art, for example U.S. Pat. No. 6,027,942, filed Jan. 17, 1997; U.S. Pat. No. 6,844,165, filed Dec. 21, 2000; U.S. Pat. No. 7,276,381, filed Dec. 20, 2002; U.S. Pat. No. 7,183,544, filed Dec. 14, 2004; U.S. Pat. No. 7,517,496, filed Jul. 21, 2001; and U.S. patent Ser. No. 10/197,115, filed Jul. 16, 2002; Ser. No. 10/289,185, filed Nov. 5, 2002; Ser. No. 10/965,092, filed Oct. 14, 2004; Ser. No. 11/058,330, filed Feb. 14, 2005; Ser. No. 11/057,880, filed Feb. 14, 2005; Ser. No. 11/682,655, filed Mar. 6, 2007; Ser. No. 10/412,679, filed Apr. 14, 2003; and Ser. No. 10/546,173, filed Oct. 24, 2006, each of which is hereby incorporated by reference in its entirety for all purposes and in particular for all teachings related to substrates and adsorbents supported by or attached to such substrates.

As few as two and as many as 10, 100, 1000, 10,000 or more adsorbents can be coupled to a single substrate. The size of the adsorbent site may be varied, depending on experimental design and purpose. However, it need not be larger than the diameter of the impinging energy source (e.g., laser spot diameter). The spots can continue the same or different adsorbents. In some cases, it is advantageous to provide the same adsorbent at multiple locations on the substrate to permit evaluation against a plurality of different eluants or so that the bound analyte can be preserved for future use or reference, perhaps in secondary processing. By providing a substrate with a plurality of different adsorbents, it is possible to utilize a plurality of binding characteristics that are provided by such a combination of different adsorbents with respect to a single sample and thereby bind and detect a wider variety of different analytes. The use of a plurality of different adsorbents on a substrate for evaluation of a single sample can be equivalent to concurrently conducting multiple chromatographic experiments, each with a different chromatography column. Using different adsorbents on the same substrate provides the advantage of requiring only a single system.

In one embodiment, adsorbent is added to predetermined addressable locations on the substrate. The addressable locations can be arranged in any pattern. In some embodiments, the patterns are regular patterns, such as lines, orthogonal arrays, or regular curves, such as circles. As will be appreciated, irregular patterns are also encompassed by the present invention.

In an exemplary embodiment, the adsorbent layer of the chips of the invention can be configured such that detection of the immobilized analyte does not require elution, recovery, amplification, or labeling of the target analyte. Moreover, in a further embodiment, the detection of one or more molecular recognition events at one or more locations within the addressable adsorbent film does not require removal or consumption of more than a small fraction of the total adsorbent-analyte complex. Thus, the unused portion can be interrogated further after one or more "secondary processing" events conducted directly in situ (i.e., within the boundary of the addressable location) for the purpose of structure and function elucidation, including further assembly or disassembly, modification, or amplification (directly or indirectly). Such adsorbent layers are known in the art and described herein.

In a further embodiment, adsorbents with improved specificity for an analyte are developed by an iterative process, referred to as "progressive resolution," in which adsorbents or eluants proven to retain an analyte are tested with additional variables to identity combinations with better binding characteristics. Such progressive resolution can be conducted using surfaces such as those described herein using methods known in the art.

The adsorbent film is attached to the linker arm layer by one of many interaction modalities with which one of skill in the art is familiar. Representative modalities include, but are not limited to, covalent attachment, attachment via polymer entanglement and electrostatic attachment. In a preferred embodiment, the layer is immobilized onto the surface by its copolymerization with a reactive group on the anchor moiety that is a locus of attachment for the adsorbent layer onto the surface. Such anchor moieties are described for example in U.S. Pat. No. 7,517,496 and U.S. patent application Ser. No. 09/908,518, filed Jul. 21, 2001; Ser. No. 10/197,115, filed Jul. 16, 2002; Ser. No. 10/289,185, filed Nov. 5, 2002; and Ser. No. 10/965,092, filed Oct. 14, 2004; Ser. No. 11/576, each of which is hereby incorporated by reference in its entirety for all purposes and in particular for all teachings related to adsorbent films and attachment of adsorbent films to surfaces of substrates.

Affinity Reagents

Adsorbents and substrates of the invention may include affinity reagents. Affinity reagents include molecules, moieties and functionalities that are capable of binding to a sample molecule. Such affinity reagents are well known in the art and are described for example in U.S. Pat. No. 6,027,942, filed Jan. 17, 1997 and U.S. Pat. No. 6,844,165, filed Dec. 21, 2000, each of which is hereby incorporated by reference in its entirety for all purposes and in particular for all teachings related to affinity reagents.

Affinity reagents of the invention include without limitation chromatographic functionalities, hydrophobic functionalities, reactive functionalities, antibodies and proteins. In one embodiment, affinity reagents used in accordance with the invention are specifically targeted type of molecule. For example, substrates comprising antibodies can be designed using methods known in the art to bind specific proteins from a sample.

In one exemplary embodiment, the affinity reagents on a surface are free of sample molecules prior to generation of the molecular print. In a further embodiment, affinity reagents are pre-wet (i.e., with a binding buffer) and/or activated using techniques known in the art prior to and/or simultaneously with transfer of sample molecules to the surface.

Photo-Reactive Polymeric Materials

In one aspect, molecular prints of the invention are in operative contact with photo-reactive polymeric materials. Such polymeric materials absorb photo-irradiation from a high fluence source to generate thermal energy and transfer that thermal energy to the molecular print to allow desorption and ionization of sample molecules from the molecular print. Such photo-reactive polymeric materials are known in the art and are for example described in U.S. Pat. No. 7,276,381, filed Dec. 20, 2002, which is hereby incorporated by reference in its entirety for all purposes and in particular for all teachings related to such photo-reactive polymeric materials and the use of such polymeric materials for detection of analytes using mass spectrometry methods.

Energy Absorbing Matrix

In one aspect, prior to the use of any detection methods, such as mass spectrometry, an energy absorbing matrix is applied to a molecular print. The energy absorbing matrix used in this aspect of the invention is any matrix useful in desorption of a molecule from a surface. Such matrixes are known in the art—two non-limiting examples include SPA and CHCA. An energy absorbing matrix can in accordance with the invention be applied to a molecular print before desorption and ionization of sample molecules for detection using mass spectrometry methods known in the art and further described herein.

Detection

Sample molecules contained in molecular prints of the invention can be detected by desorption spectrometry. In an exemplary aspect, such desorption spectrometry methods include the steps of desorbing the sample molecules from the molecular print and directly detecting the desorbed molecules.

In one aspect, the invention provides methods of analyzing the spatial arrangement of molecules within a sample. In one exemplary aspect, a sample is transferred to a surface such that the spatial arrangement of molecules within the sample is maintained. In another exemplary aspect, a sample is transferred to a surface without maintaining the spatial arrangement of the molecules. For either the spatially oriented or non-spatially oriented molecular prints, in an exemplary embodiment, the surface to which the sample is transferred comprises an adsorbent film. In a further exemplary embodiment, the adsorbent film includes affinity reagents and/or photo-reactive polymers, as further described herein. Methods of this aspect of the invention further include the step of detecting adsorbence of molecules from the sample on the adsorbent film. In an exemplary embodiment, the step of detecting adsorbence of the sample molecules involves the use of laser desorption mass spectrometry. Such laser desorption mass spectrometry methods are well known in the art and are also further described herein.

In one aspect, the invention provides methods of detecting and analyzing a sample which has been transferred to a surface to form a test surface. In such methods, the test surface is struck with energy from a high fluence source, such as a laser beam, such that a predetermined laser spot on the test surface releases sample molecules. The molecular atomic masses of released sample molecules are measured over a range of atomic masses. The steps of striking the test surface at a predetermined laser spot on the test surface and measuring the atomic mass of released sample molecules over a range of atomic masses can be repeated until a selected area of the sample is analyzed. An atomic mass window within the range of atomic masses can generally be analyzed to determine the spatial arrangement of molecules within the sample. Such an analysis can be conducted using methods known in the art. "Atomic mass window" refers to a preselected range of atomic masses which may, in certain non-limiting exemplary embodiments, represent molecules of interest. In a further embodiment, analyzing the atomic mass window according to the invention involves graphically depicting the mass of molecules with the atomic mass window as a function of linear distance between different predetermined laser spots on the test surface.

Figure 20:
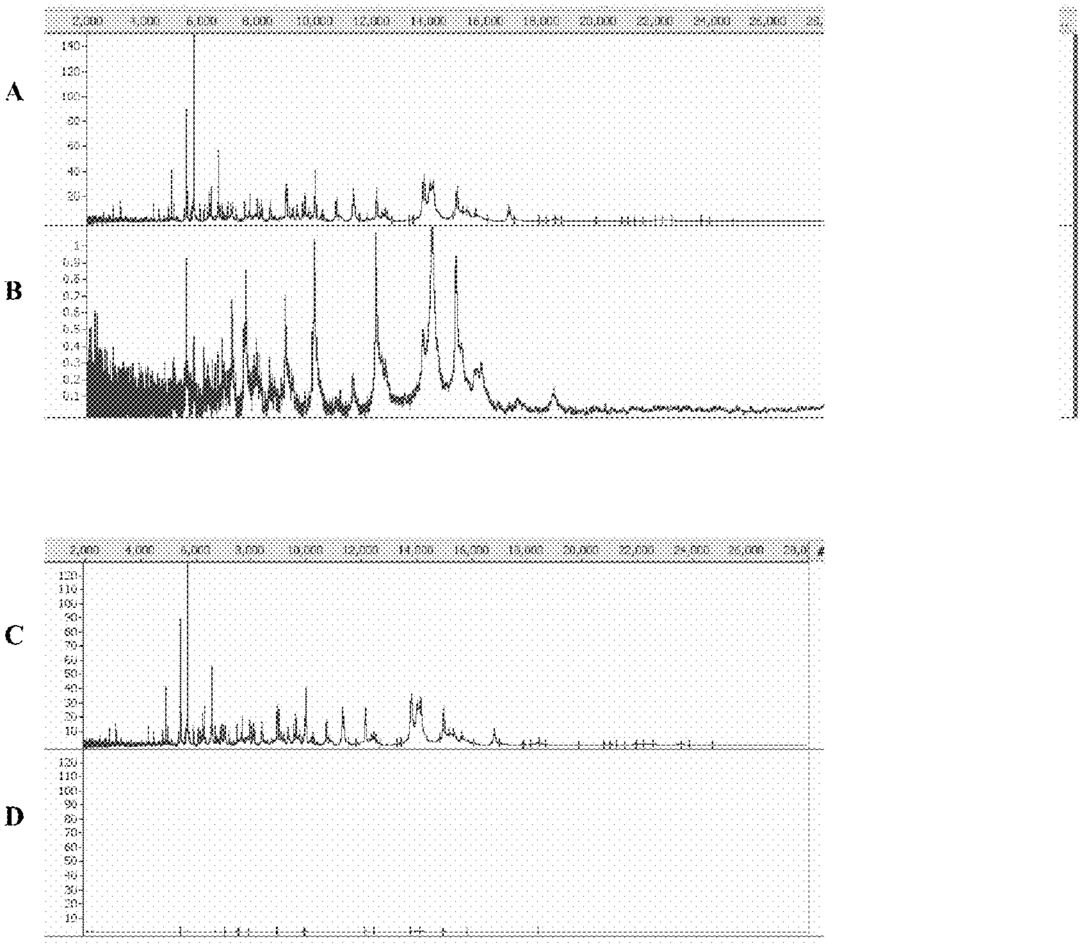
FIG. 20 compares spectra from molecular prints (FIGS. 20A and C) to tissue prints (FIGS. 20B and D).
Figure 21:
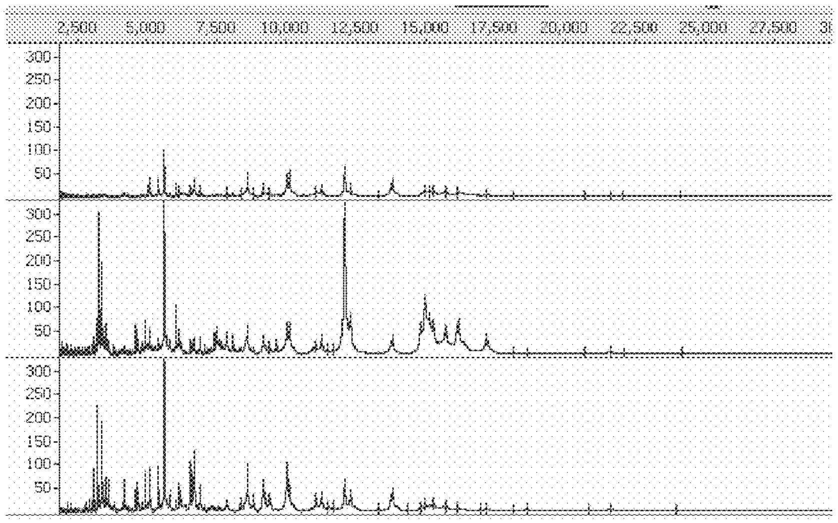
FIG. 21 shows spectra from a molecular print with no subsequent treatment (top trace), after application of a binding buffer (middle trace) and after a wash in de-ionized water (bottom trace).

As described herein, the molecular prints used in the detection methods of the method are generated by adsorbing molecules from a sample to a surface. In some embodiments, the spatial arrangement of the molecules is maintained. Spectra generated from molecular prints of the invention can thus be used to identify and quantify the spatial distribution of these sample molecules. An advantage provided by the methods of the present invention is that more molecules can be captured than is possible from other conventional methods of analyzing samples using methods such as mass spectrometry. For example, as shown in FIG. 20, molecular prints made according to the present invention isolate more species of molecules than conventional tissue prints. FIG. 20A is a molecular print generated according to the invention and interrogated by SELDI, whereas FIG. 20B is a tissue print interrogated using MALDI. As is evident from FIG. 20, the molecular print in FIG. 20A results in isolation of a greater number of molecular species (i.e., provides more peaks) than the tissue print in FIG. 20B. FIGS. 20C and D are the same spectra as FIGS. 20A and B placed on the same scale.

In some aspects, molecular prints are further processed after the sample is transferred to a surface to further clarify and optimize the detection of molecular species from the sample. In general, for prints that are spatially-resolved, the further processing does not disturb the relative spatial orientation of the molecules transferred to the surface.

In an exemplary embodiment, sample molecules that are not adsorbed to the surface are removed before any detection methods are applied to the molecular print. In general, molecules that are not adsorbed to the surface are removed in a wash step, for example by application of deionized water or standard buffers known in the art.

In a further exemplary embodiment, binding buffer is applied simultaneously with or after a sample is transferred to a surface. Such binding buffers are known in the art.

In a further exemplary embodiment, an energy absorbing matrix is added to the molecular print before any detection methods are applied to the molecular print. Such an energy absorbing matrix can be applied to the molecular print after a wash step, but can also be applied if non-adsorbed particles are not first removed from the print.

Methods for Desorption

Desorbing the analyte from the adsorbent involves exposing the analyte to an appropriate energy source. Usually this means striking the analyte with radiant energy or energetic particles. For example, the energy can be light energy in the form of laser energy (e.g., UV laser) or energy from a flash lamp. Alternatively, the energy can be a stream of fast atoms. Heat may also be used to induce/aid desorption.

Methods of desorbing and/or ionizing analytes for direct analysis are well known in the art. One such method is called matrix-assisted laser desorption/ionization, or MALDI. In MALDI, the analyte solution is mixed with a matrix solution and the mixture is allowed to crystallize after being deposited on an inert probe surface, trapping the analyte within the crystals may enable desorption. The matrix is selected to absorb the laser energy and apparently impart it to the analyte, resulting in desorption and ionization. Generally, the matrix absorbs in the UV range. MALDI for large proteins is described in, e.g., U.S. Pat. No. 5,118,937 (Hillenkamp et al.) and U.S. Pat. No. 5,045,694 (Beavis and Chait), each of which is hereby incorporated by reference in its entirety for all purposes and in particular for all teachings related to MALDI.

Surface-enhanced laser desorption/ionization, or SELDI, represents a significant advance over MALDI in terms of specificity, selectivity and sensitivity. SELDI is described in U.S. Pat. No. 5,719,060 (Hutchens and Yip) which is hereby incorporated by reference in its entirety for all purposes and in particular for all teachings related to SELDI.

SELDI is a solid phase method for desorption in which the analyte is presented to the energy stream on a surface that enhances analyte capture and/or desorption. In contrast, MALDI is a liquid phase method in which the analyte is mixed with a liquid material that crystallizes around the analyte.

One version of SELDI, called SEAC (Surface-Enhanced Affinity Capture), involves presenting the analyte to the desorbing energy in association with an affinity capture device (i.e., an adsorbent). It was found that when an analyte is so adsorbed, it can be presented to the desorbing energy source with a greater opportunity to achieve desorption of the target analyte. An energy absorbing material can be added to the probe to aid desorption. Then the probe is presented to the energy source for desorbing the analyte Another version of SELDI, called SEND (Surface-Enhanced Neat Desorption), involves the use of a layer of energy absorbing material onto which the analyte is placed. A substrate surface comprises a layer of energy absorbing molecules chemically bond to the surface and/or essentially free of crystals. Analyte is then applied alone (i.e., neat) to the surface of the layer, without being substantially mixed with it. The energy absorbing molecules, as do matrix, absorb the desorbing energy and cause the analyte to be desorbed. This improvement is substantial because analytes can now be presented to the energy source in a simpler and more homogeneous manner because the performance of solution mixtures and random crystallization is eliminated. This provides more uniform and predictable results that enable automation of the process. The energy absorbing material can be classical matrix material or can be matrix material whose pH has been neutralized or brought into the basic range. The energy absorbing molecules can be bound to the probe through covalent or noncovalent means.

Another version of SELDI, called SEPAR (Surface-Enhanced Photolabile Attachment and Release), involves the use of photolabile attachment molecules. A photolabile attachment molecule is a divalent molecule having one site covalently bound to a solid phase, such a flat probe surface or another solid phase, such as a bead, that can be made part of the probe, and a second site that can be covalently bound with the affinity reagent or analyte. The photolabile attachment molecule, when bound to both the surface and the analyte, also contains a photolabile bond that can release the affinity reagent or analyte upon exposure to light. The photolabile bond can be within the attachment molecule or at the site of attachment to either the analyte (or affinity reagent) or the probe surface.

Method for Direct Detection of Analytes

A desorbed analyte can be detected by any of several means. When the analyte is ionized in the process of desorption, such as in laser desorption/ionization mass spectrometry, the detector can be an ion detector. Mass spectrometers generally include means for determining the time-of-flight of desorbed ions. This information is converted to mass. However, one need not determine the mass of desorbed ions to resolve and detect them: the fact that ionized analytes strike the detector at different times provides detection and resolution of them.

Alternatively, the analyte can be detectably labeled with, e.g., a fluorescent moiety or with a radioactive moiety. In these cases, the detector can be a fluorescence or radioactivity detector.

A plurality of detection means can be implemented in series to fully interrogate the analyte components and function associated with analytes at each location in an array.

Desorption Detectors

Desorption detectors comprise means for desorbing the analyte from the adsorbent and means for directly detecting the desorbed analyte. That is, the desorption detector detects desorbed analyte without an intermediate step of capturing the analyte in another solid phase and subjecting it to subsequent analysis. Detection of an analyte normally will involve detection of signal strength. This, in turn, reflects the quantity of analyte adsorbed to the adsorbent.

Beyond these two elements, the desorption detector also can have other elements. One such element is means to accelerate the desorbed analyte toward the detector. Another element is means for determining the time-of-flight of analyte from desorption to detection by the detector.

A preferred desorption detector is a laser desorption/ionization mass spectrometer, which is well known in the art. The mass spectrometer includes a port into which the substrate that carries the adsorbed analytes, e.g., a probe, is inserted. Desorption is accomplished by striking the analyte with energy, such as laser energy. The device can include means for translating the surface so that any spot on the array is brought into line with the laser beam. Striking the analyte with the laser results in desorption of the intact analyte into the flight tube and its ionization. The flight tube generally defines a vacuum space. Electrified plates in a portion of the vacuum tube create an electrical potential which accelerate the ionized analyte toward the detector. A clock measures the time of flight and the system electronics determines velocity of the analyte and converts this to mass. As any person skilled in the art understands, any of these elements can be combined with other elements described herein in the assembly of desorption detectors that employ various means of desorption, acceleration, detection, measurement of time, etc.

Desorption detectors of use in accordance with the invention are well known in the art and are further described herein and in references discussed herein.

Systems and Apparatus

In one aspect, the invention provides an apparatus or system for analyzing a test sample. Such an apparatus can include a test specimen comprising sample molecules of interest. In a further aspect, this test specimen may be in operative contact with a polymeric material. Such a polymeric material may in accordance with the invention include one or more affinity reagents capable of interacting with the sample molecules of interest in the test specimen. In an exemplary embodiment, the polymeric material is attached to a substrate, wherein that substrate has a surface. In a further embodiment, the polymeric material is attached to the surface of the substrate. In a still further exemplary embodiment, the substrate comprises a removably insertable mass spectrometry probe. As described further herein, the test specimen may be a molecular print generated by transferring a sample to a surface.

In a further aspect, an apparatus or system of the invention can include a fluence source for sequentially striking the test specimen at a plurality of predetermined spots. This fluence source is thus able to sequentially release sample molecules from these predetermined spots.

In a still further aspect, an apparatus or system of the invention can include a mass analyzer. The mass analyzer can be used to measure atomic mass of released sample molecules over a range of atomic masses.

In a still further aspect, an apparatus or system of the invention includes a computer system for receiving atomic mass data from the mass analyzer as well as a display for depicting atomic mass as a function of individual spots on the test specimen.

In one embodiment, an apparatus or system of the invention includes a photo-reactive polymer that absorbs photoirradiation from a fluence source to generate thermal energy and then transfers that thermal energy to allow desorption and ionization of sample molecules from the test specimen, which can in this embodiment be in operative contact with the photo-reactive polymer.

In a further embodiment, an apparatus or system of the invention includes an energy absorbing matrix, which can be applied to a test specimen before desorption and ionization of sample molecules for detection using methods described herein.

In one aspect, the invention provides computer systems, including hardware and software, for selecting particular areas of a molecular print for imaging. In one embodiment, such selection of particular areas is provided by computer systems which allows choice of pixel-by-pixel or integrated data collection.

In one aspect, the invention provides computer systems for correlating printed pixels with stained or otherwise identified areas. Such computer systems can allow splitting of stained areas into regions and allow either pixel-by-pixel or integrated data collection and/or analysis.

In a further aspect, computer systems in accordance with the invention can be used to analyze spectra for peaks that correspond to particular spatial areas and/or have other statistical relevance. Correlation of this to stained or otherwise identified areas can also be accomplished.

Applications and Assays

As will be appreciated, molecular prints of the invention used with mass spectrometry methods as described herein can be applied to a wide range of assays. For example, the ability to detect and quantify the spatial arrangement of specific molecules within a sample is useful in the study of, in some non-limiting examples: biomarkers, of drug targets, spatial distribution of toxicology markers, contaminants, drug metabolites, cell-level molecular mechanisms, and the like.

In one non-limiting exemplary embodiment, molecular prints of the invention can be used to study the spatial distribution of beta-amyloid plaques in brain tissue. Such information can be used in particular in the study and diagnosis of illnesses associated with such plaques, such as Alzheimer's disease. In such an embodiment, a molecular print is generated from brain tissue by transferring molecules from the brain tissue to a surface such that the spatial distribution of the molecules is maintained. In this embodiment, the surface may comprise affinity reagents, such as antibodies, which selectively retain beta-amyloid molecules from the sample. This print is then subjected to detection methods, such as the desorption and ionization methods described herein, to identify and quantify the retained beta-amyloid molecules from the sample. Since the print is generated in such that the spatial distribution of molecules in the tissue sample is maintained, detection of molecules in the molecular print will provide information on the spatial distribution of beta amyloid in the tissue.

The present invention may be better understood by reference to the following non-limiting Examples, which are provided as exemplary of the invention. The following examples are presented in order to more fully illustrate preferred embodiments of the invention, but should in no way be construed as limiting the broad scope of the invention.

While this invention has been disclosed with reference to specific embodiments, it is apparent that other embodiments and variations of this invention may be devised by others skilled in the art without departing from the true spirit and scope of the invention.

All patents, patent applications, and other publications cited in this application are incorporated by reference in the entirety.

EXAMPLES

Example 1

Comparison of Tissue Prints on Different Substrates

Tissue molecular prints were analyzed on different substrates under a variety of conditions, including the presence or absence of buffer, the presence or absence of a washing step, the type of matrix used (CHCA or SPA).

Brain tissue from female Zebra Finch was sectioned with razor and incubated on-chip in a humid chamber for 30 minutes Laser optimization was done for each matrix and chip type Data analysis was performed using low mass 1800-25000 as range. Noise set to this range. Baseline was 15×epw. Peaks were detected at 2 signal:noise 1 valley for most sensitive peak detection. High mass 25000-end was used as range. Noise was set to this range. Baseline was 15×epw. Peaks were detected at 5 signal:noise 2 valley for most robust peak detection and to avoid artifacts.

Figure 15:
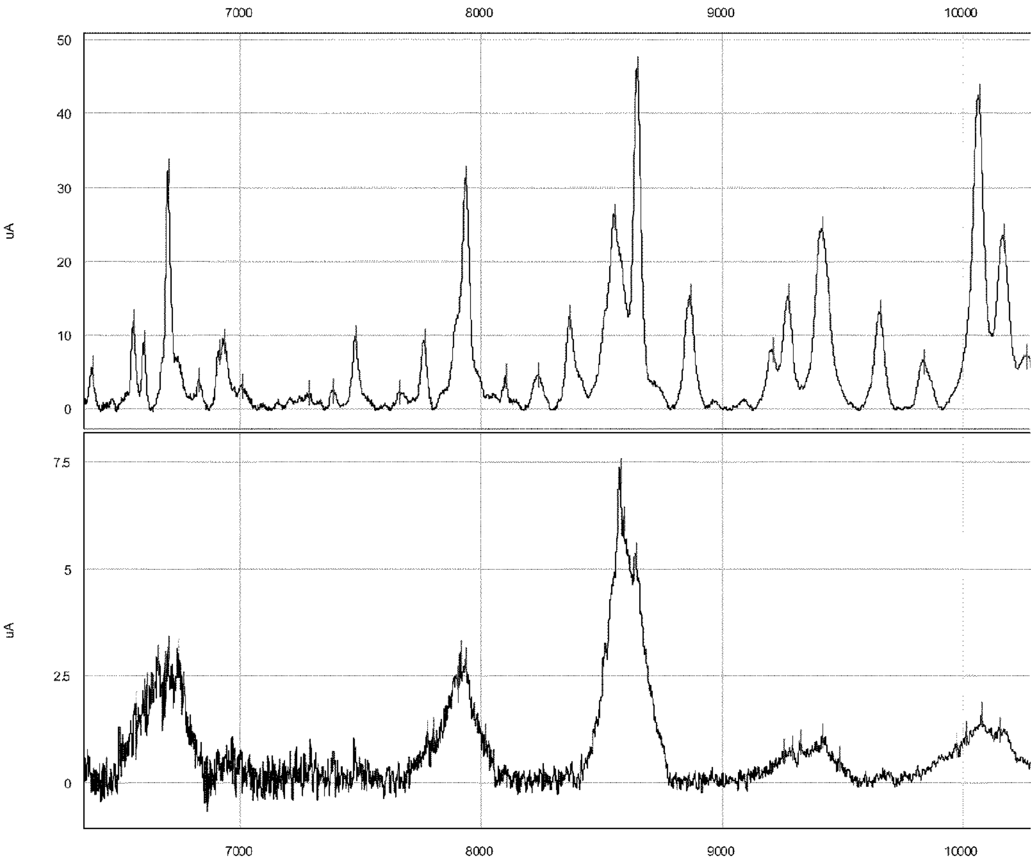
FIG. 15 compares spectra from H50 chips with SPA (top trace) and CHCA (bottom trace) used as a matrix.
Figure 16:
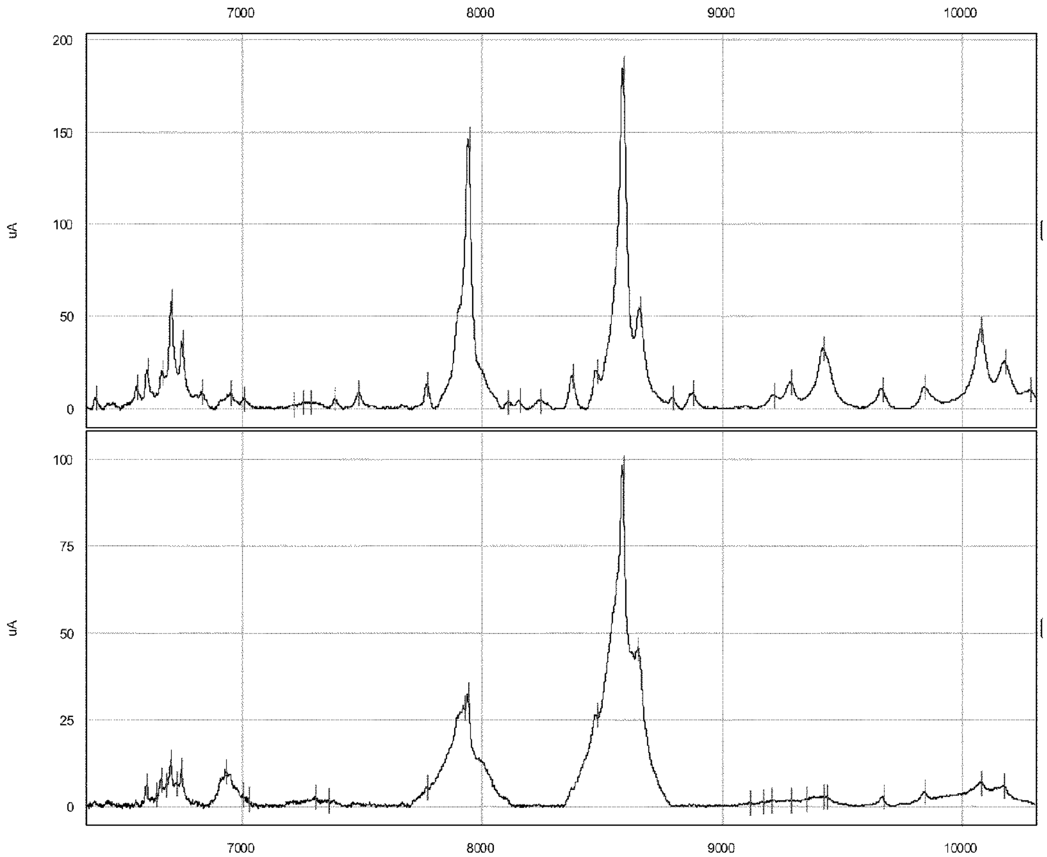
FIG. 16 compares spectra from CM10 chips with SPA (top trace) and CHCA (bottom trace) used as a matrix.

As shown in FIGS. 15 and 16, data from experiments in which SPA was used as a matrix produced cleaner spectra than CHCA for both H50 and CM10 chips.

Using a binding buffer can produce cleaner data, but such buffer is not necessary for producing spectra. For spatially resolved molecular prints, binding buffer is generally not used in order to retain the spatial orientation of the molecules in the sample.

Example 2

Pixel-by-Pixel Data with Serum Applied in Bath (No Printing)

Figure 14:
FIG. 14 shows data from whole surface imaging of a SELDI chip using a SELDI protocol without molecular printing.

Serum applied to a SELDI chip without molecular printing can be used with a SELDI protocol to show the utility of the methods and software of the present invention for fully mapping the surface of a chip. FIG. 14 shows the results of one pixel-by-pixel data analysis of a chip. In the chip, 8 spots are present: 4 were positive (serum applied) and 4 were negative (no serum applied). The spaces between the spots were a hydrophobic coating (Cytonix). Only the 4 positive spots showed signal. In addition, they showed a uniform response across the pixels contained within each spot. The negative spots (no sample applied), did not show signal. In addition, the Cytonix did not show signal. These results demonstrate that methods and software of the invention i) correctly map the expected geographical areas and ii) return the appropriate values. The results in FIG. 14 also demonstrate that within the spots, pixel capacity is sufficient to generate data.

Capacity of the fully derivatized surface was investigated by taking spectra on individual pixels. Each spectrum was the average of 10 shots; similar spectra were observed across the surface. Peak clustering was performed with peaks present at >5% of all spectra. 7 peaks could be observed in >90% of all pixels. 35 peaks were observed in >50% of all pixels.

Figure 12:
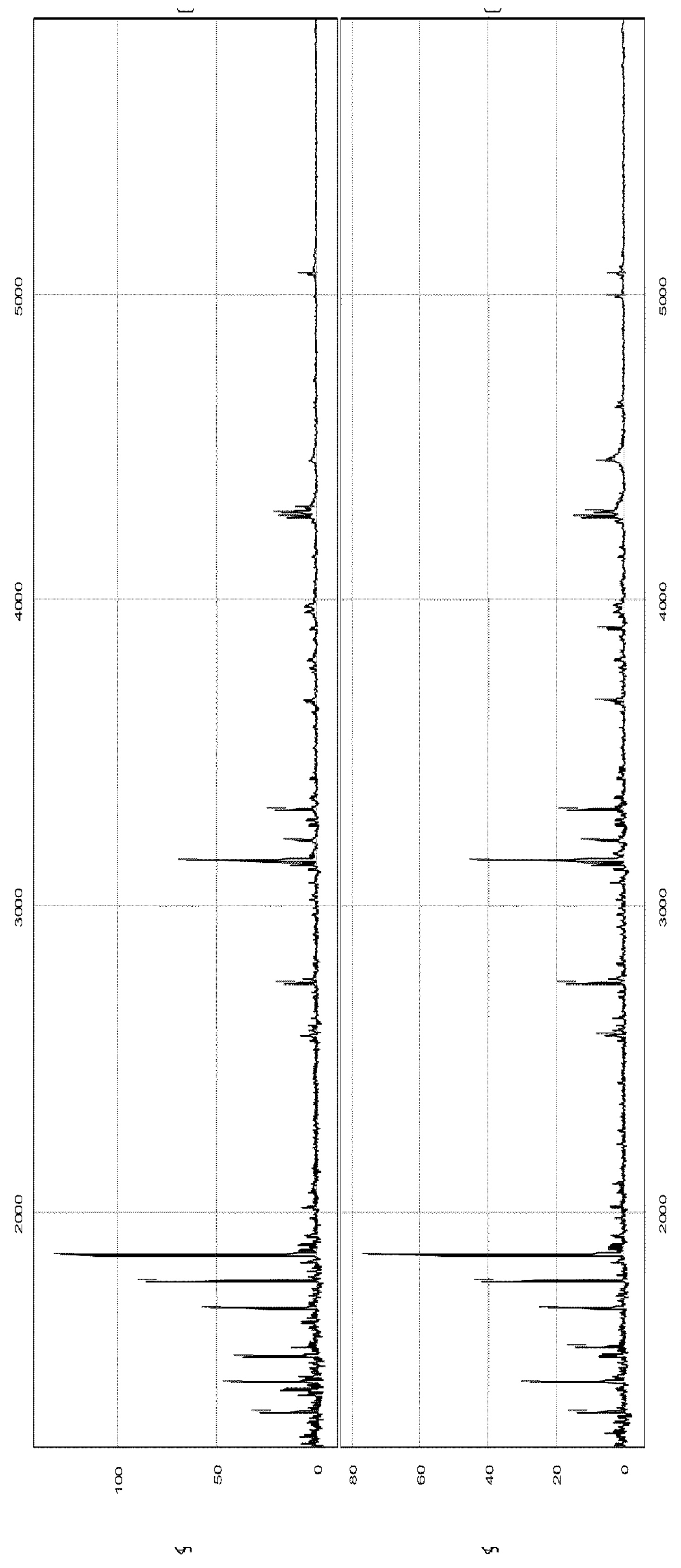
FIG. 12 compares spectra from normal surface (top trace) and whole-surface derivatized surface (bottom trace).
Figure 13:
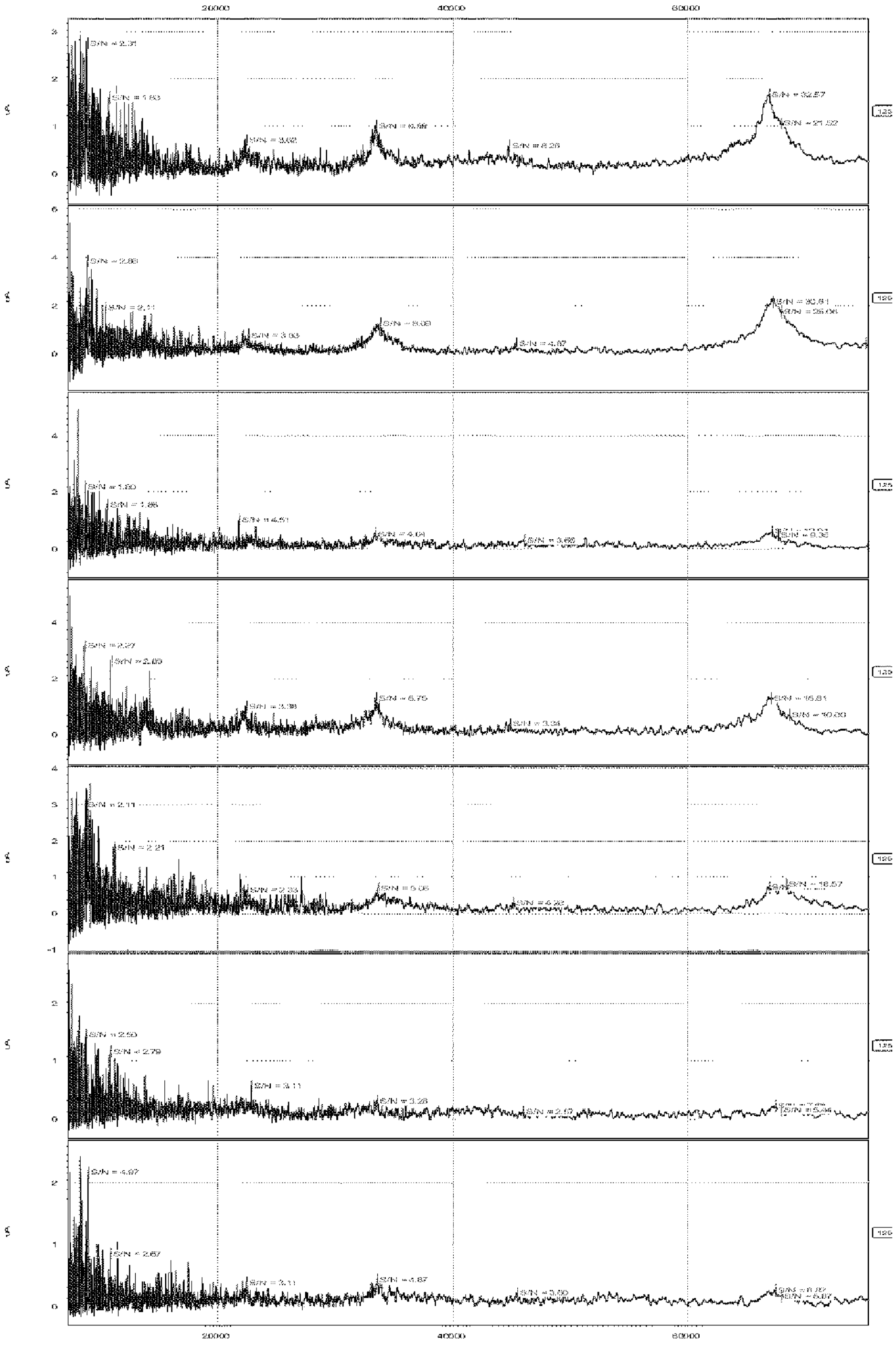
FIG. 13 shows spectra on individual pixels from CM10 applied to whole surface.

FIG. 12 shows spectra from a normal surface (top trace) and a derivatized surface (bottom trace). The derivatized surface displayed more peaks (and thus data on more molecular species) than the normal surface. FIG. 13 shows spectra on individual pixels from CM10 applied to a whole surface. FIG. 13 shows that it is possible to take molecular prints with enough capacity such that a spectrum may be generated from each pixel. This allows imaging analysis from a surface simultaneously for multiple species.

Example 3

Imaging Using Direct Desorption from Zebra Finch Brain Tissue

Figure 2:
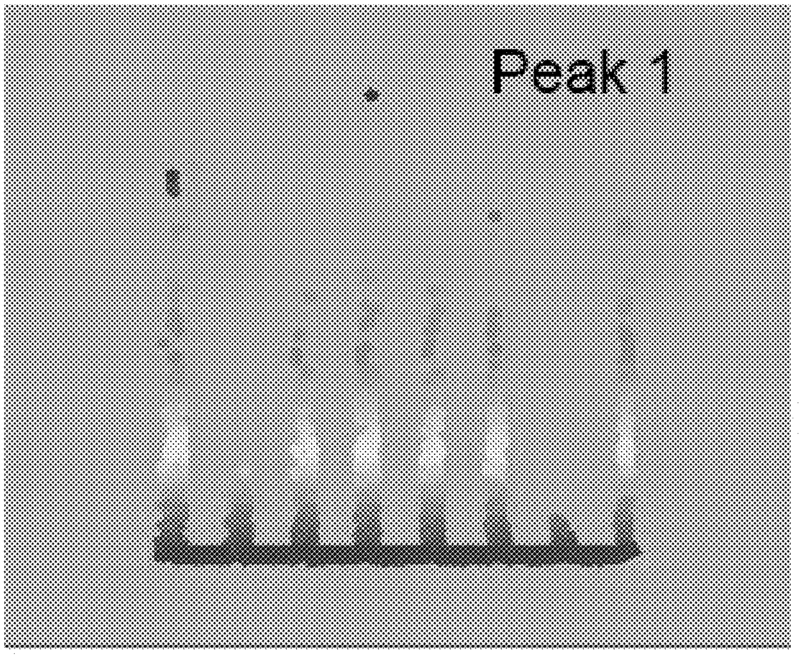
FIG. 2 shows imaging data from direct desorption from zebra finch brain tissue.
Figure 2:
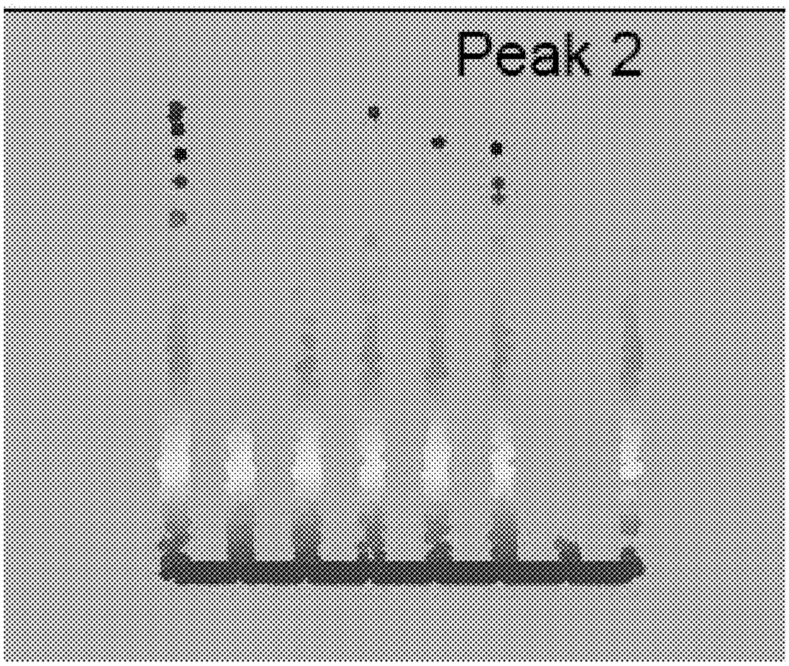
Figure 3:
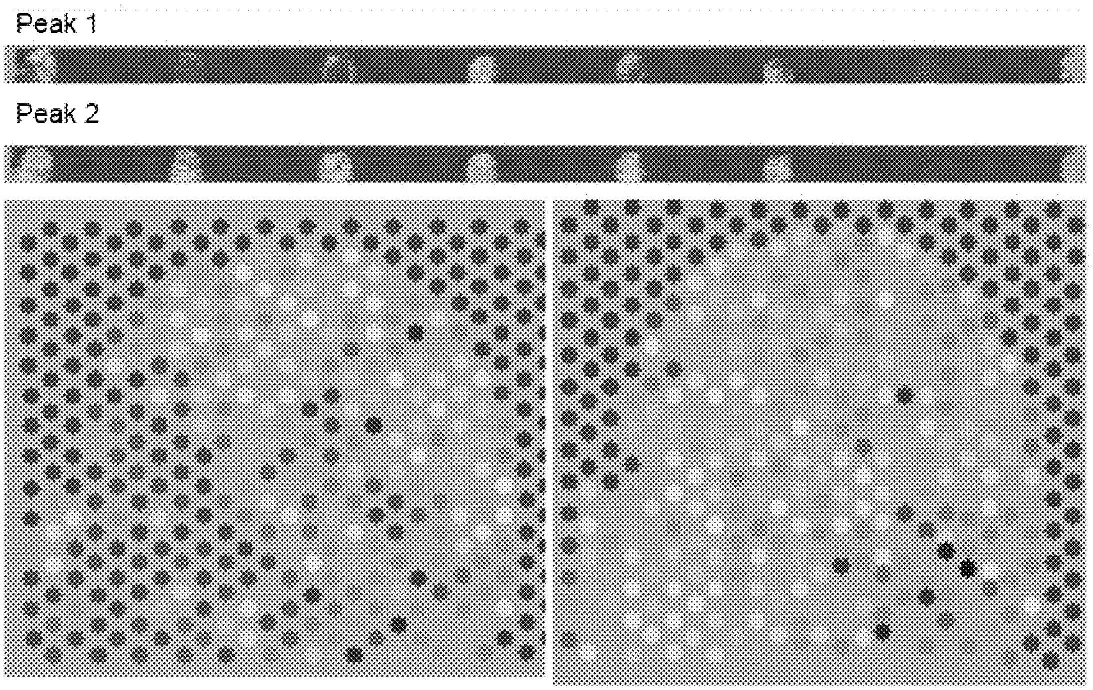
FIG. 3 shows imaging data from direct desorption from zebra finch brain tissue.
Figure 4:
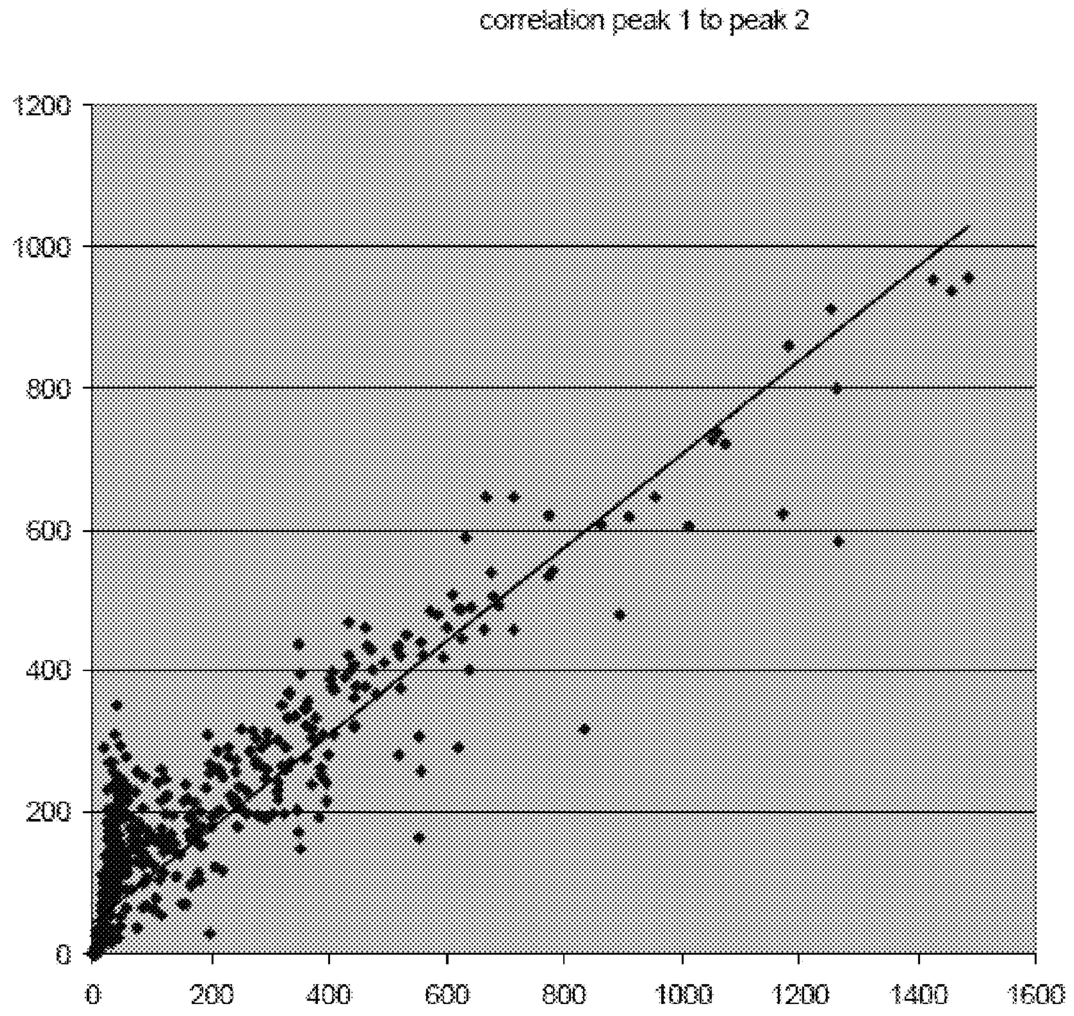
FIG. 4 shows correlation data between peak 1 and peak 2 from imaging data from direct desorption from zebra finch brain tissue.

FIGS. 2 and 3 show data from a PCS instrument of zebra finch brain tissue mounted on a chip. FIG. 4 shows that there is a correlation between different peaks, showing that the peaks do not vary randomly. Thus, methods of the invention can be used to detect and quantify the spatial distribution of molecules such as biomarkers.

Figure 6:
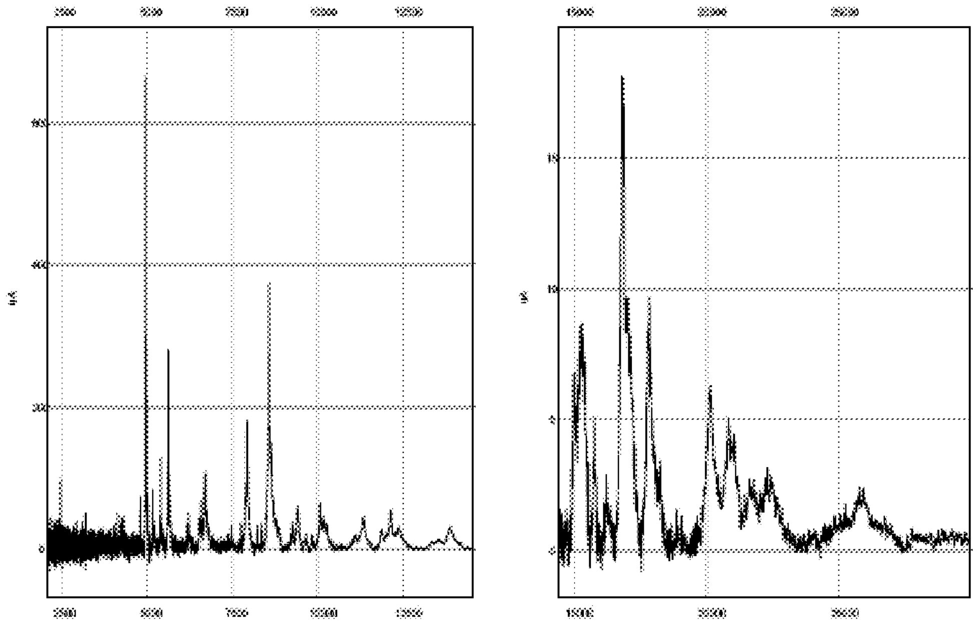
FIG. 6 shows single-pixel spectra directly desorbed from zebra finch brain tissue. Both panels of FIG. 6A are from the same spectrum and were collected at the same time.
Figure 6:
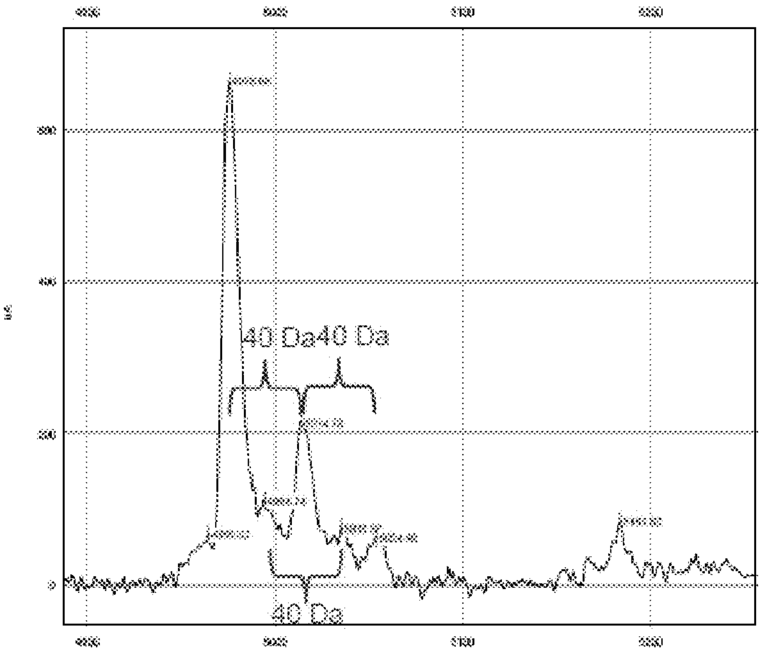

FIGS. 6A and 6B show that the sensitivity of the instrument is able to show details of modification of species. The spectra in the two panels of FIG. 6A are from the same spectrum obtained from zebra finch brain tissue. The spectra in FIG. 6A are split to show both larger and smaller peaks, but the spectra in both panels were collected at the same time. FIG. 6B shows a more detailed view of the spectra from FIG. 6A.

Example 4

Gel Print Transfer of Molecular Weight Standards to SELDI Surface

Bands were cut and eluted from 1-D gels of molecular weight standards in different reaction conditions in which variables were altered, including elution times, SELDI surfaces, buffers, washes, and matrix.

The SELDI surfaces were pre-wet with binding buffer, and strips of gel were placed on spots on the chip, binding or transfer buffer was added, and the chips were incubated in a humid chamber for times ranging from 1 hour to several days. The gel was then removed from the chamber, desalted, and an energy absorbing matrix was applied.

Figure 5:
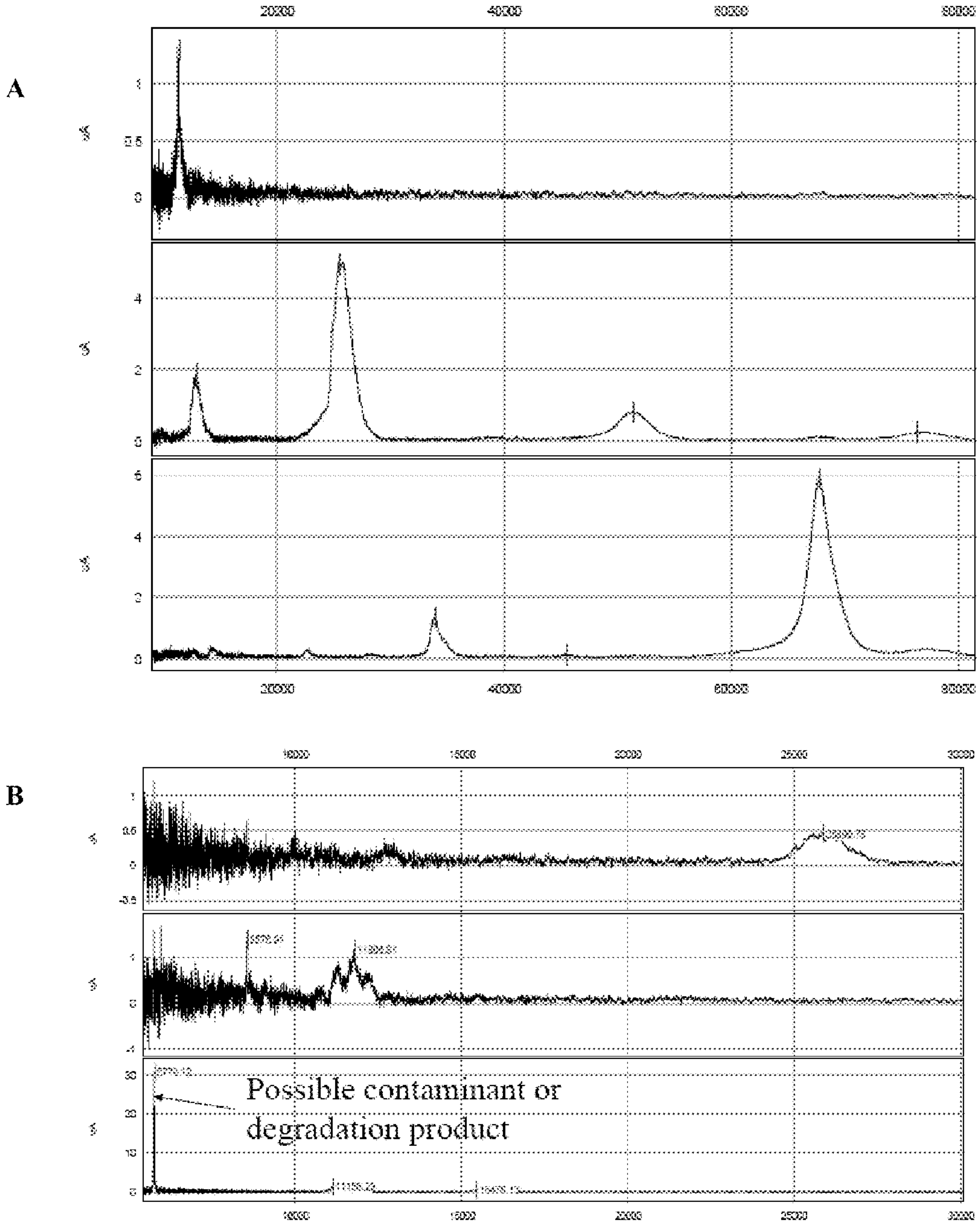
FIG. 5 shows mass spectra from single-species transfer of molecular weight standards to different surfaces.

FIG. 5A shows traces from an overnight transfer of a gel to two different surfaces. The top trace in FIG. 5A is an H50 chip, whereas the bottom two traces are from a Q10 (Bio-Rad Laboratories, Inc.) chip.

FIG. 5B shows traces from a 30 minute transfer of a gel to a CM10 chip.

An exemplary protocol for generating prints from 1-D gels is as follows:

1. Section the 1-D gel containing fluorescent tagged protein standards to provide the desired surfaces for analysis in a thin slice.
2. Apply excess low stringency buffer to the SELDI surface and allow 5 minutes equilibration at ambient temperature.
3. Remove low stringency buffer by vacuum aspiration.
4. Apply strip of gel from different area to SELDI surface.
5. Apply binding buffer to gel on the SELDI surface such that the entire exposed surface is engulfed in buffer; or apply transfer buffer to gel on the SELDI surface such that the entire exposed surface is engulfed in buffer
6. Place the ProteinChip from step 5 into a humid chamber and store overnight at 4 Degrees Celsius; or 1 h at room temperature.
7. Remove the ProteinChip from the humid chamber, and remove the gel using vacuum aspiration, or tweezers.
8. Wash the SELDI surface target area (print area) using low stringency buffer in excess with micromix agitation. Recommended micromix settings are form 20, amplitude 5, and five minutes.
9. A final de-salt wash step is performed by applying deionized water in excess to the ProteinChip target (print area). Micromix the sample using form 20, amplitude 5, time 1 minute. (In some embodiments, a wash with deionized water is used instead of micromix. In other embodiments, this final de-salt wash step is not conducted.)
10. Allow the chip to fully air dry. This will take at least ten minutes. Visual assessment is used to determine dryness.
11. Prepare SPA matrix by mixing 200 microliters of acetonitrile and 200 uL of 1% trifluoracetic acid (aqueous) to a tube of Bio-Rad SPA.
12. Apply 1.0 microliters of matrix from step 12 to the target (print area), and allow to fully air dry.
13. Repeat step 12.
14. Read the ProteinChip on a PCS Mass Spectometry System using Full Surface Scan software, or Ciphergen Express Software if the target area is contained within the eight spot format target area.

Example 5

Non-Spatially Resolved Molecular Prints from Zebra Finch Organs

Figure 7:
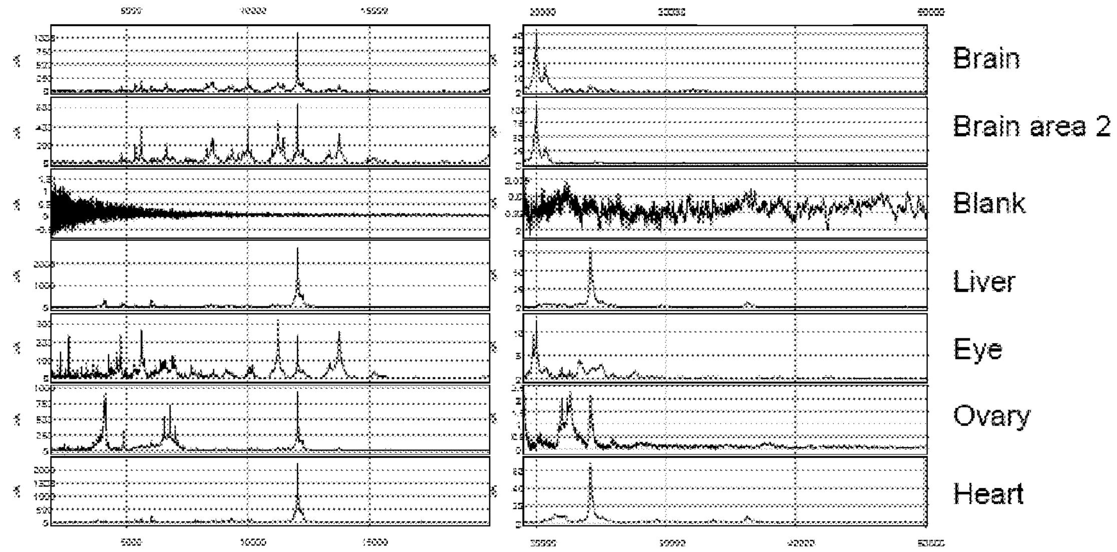
FIG. 7 shows mass spectra from non-spatially resolved transfer of different bird organs to CM10 surface.

Spectra from different organs on a CM10 surface were collected. The spectra for each organ were collected at the same time. Two different mass regions are displayed for each organ with different intensity scales in FIG. 7. These data demonstrate the sensitivity and dynamic range of the instrument. The blank sample showed a blank spectrum, demonstrating that the spectra from the organs were not artifacts of the system.

Figure 8:
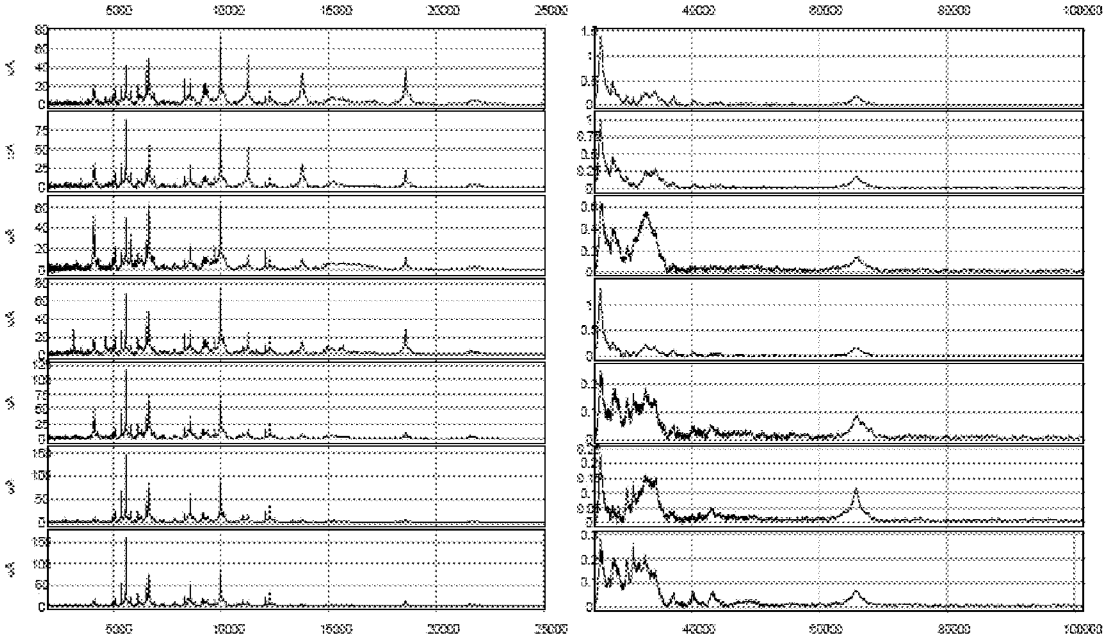
FIG. 8 shows mass spectra from different prints of non-spatially resolved avian heart transfer to CM10 surface.

FIG. 8 illustrates the reproducibility of spectra from adjacent areas of the same organ—in this exemplary embodiment, spectra were taken of tissue from avian heart.

Figure 9:
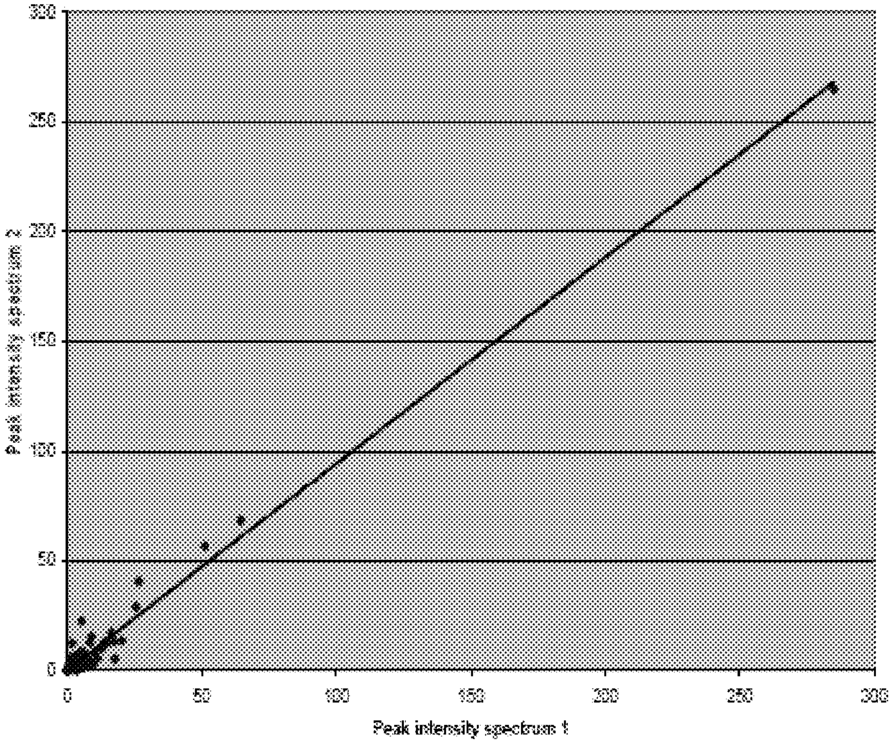
FIG. 9 shows (A) a graph of correlation of peak intensities for zebra finch heart prints on CM10 surface and (B) correlation coefficients for 8 spectra.
Figure 10:
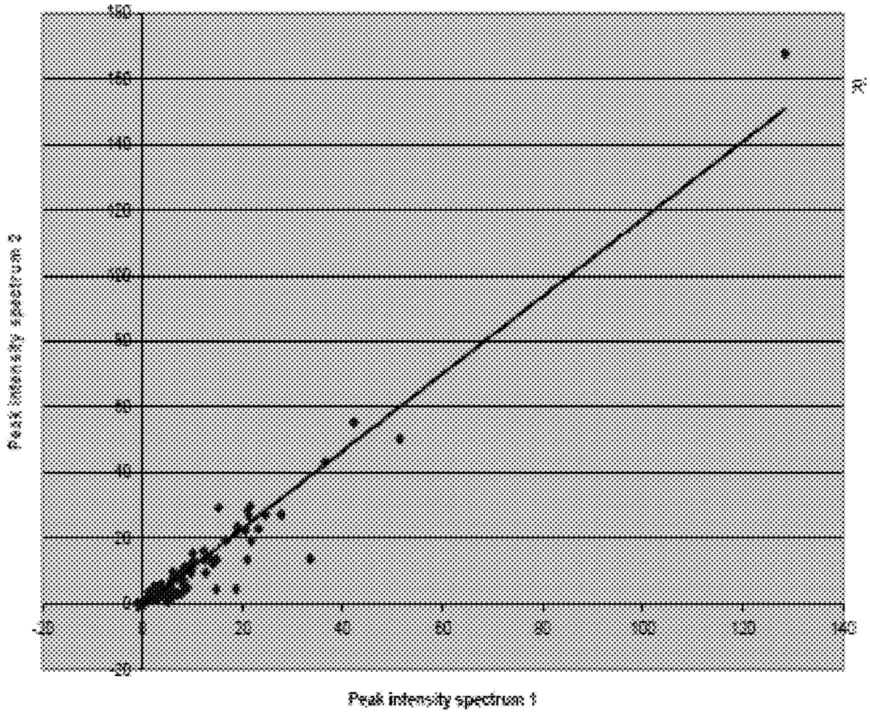
FIG. 10 shows (A) a graph of correlation of peak intensities for zebra finch brain prints on CM10 surface and (B) correlation coefficients for 7 spectra.

FIG. 9A is a plot of intensity for each peak within a spectrum for zebra finch heart prints and FIG. 10A is a similar plot for zebra finch brain prints. These data show that across an entire spectra fingerprint, the spectra are well correlated in their intensity for all common peaks. The plot in FIG. 9A has an $R^2$ value of 0.9822, and the plot in FIG. 10A has $R^2$ value of 0.9449. FIGS. 9B and 10B show correlation coefficients for a number of spectra.

Example 6

Spatially Resolved Molecular Prints from Zebra Finch Organs

Figure 11:
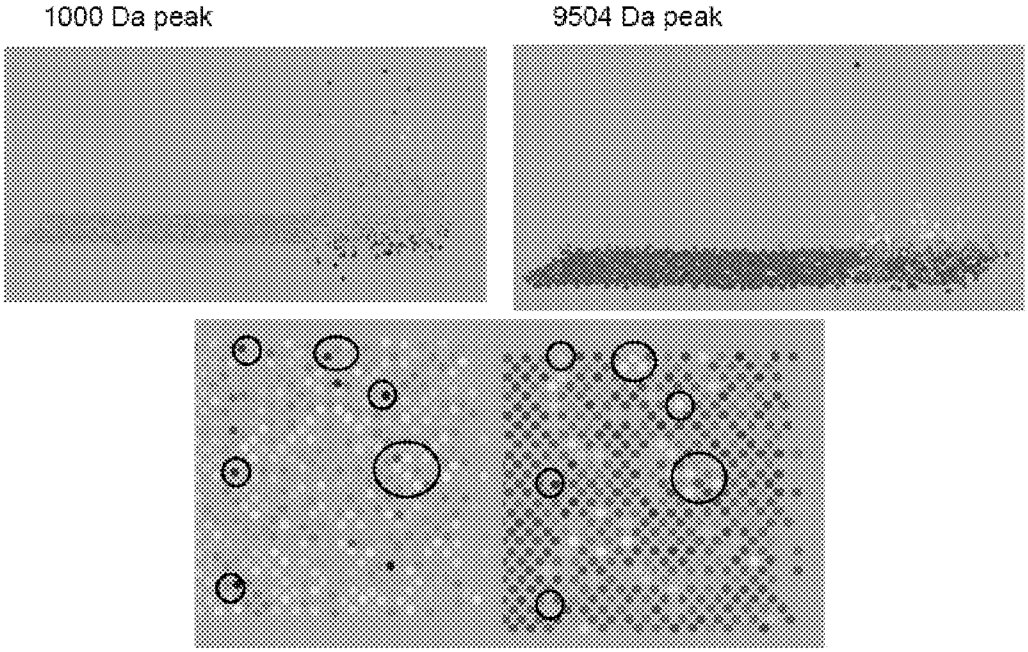
FIG. 11 shows spatially resolved data for molecular print of zebra finch brain.

In FIG. 11, the circles show correlation of high-intensity points for two different peak masses. The peaks occur within a spatially-resolved molecular print from zebra finch brain tissue.

In one exemplary aspect, such scans are generated using the following protocol:

1. Wash the tissue with physiological buffer, to remove residual blood/serum contaminant proteins
2. Slice brain tissue using a cryotome
3. Place thin slices of tissue on a NP20 array (or any other) without any additional preparation.
4. Place the ProteinChip from step 3 into a humid chamber and store overnight at room temperature; or allow ProteinChip from step 3 to air-dry overnight at room temperature.
5. Remove the ProteinChip from the humid chamber, and allow the chip to fully air dry. This will take at least 30 minutes. Visual assessment is used to determine dryness.
6. Prepare SPA matrix by mixing 200 microliters of acetonitrile and 200 uL of 1% trifluoracetic acid (aqueous) to a tube of Bio-Rad SPA.
7. Apply 1.0 microliters of matrix from step 12 to the target (print area), and allow to fully air dry.
8. Repeat step 7.
9. Read the ProteinChip on a PCS Mass Spectometry System using Full Surface Scan software, or Ciphergen Express Software if the target area is contained within the eight spot format target area.

In a further exemplary aspect, spatially resolved tissue prints are generated using the following protocol:

1. Wash the tissue with physiological buffer, to remove residual blood/serum contaminant proteins.
2. Section the tissue to provide the desired surfaces for analysis in a thin slice.
3. Apply PBS to the SELDI surface and allow 5 minutes equilibration at ambient temperature.
4. Remove PBS by vacuum aspiration.
5. Apply thin slice section of tissue to pre-wet SELDI surface.
6. Apply low stringency buffer to tissue on the SELDI surface such that the entire exposed surface is engulfed in buffer. Binding buffer is not necessary, but can facilitate the transfer and result in more intense peaks.
7. Place the ProteinChip from step 6 into a humid chamber and store overnight at 4 Degrees Celsius, or 30 min, or 1 h at room temperature.
8. Remove the ProteinChip from the humid chamber, and remove the tissue using vacuum aspiration, or tweezers.
9. Wash the SELDI surface target area (print area) using low stringency buffer in excess with micromix agitation. Recommended micromix settings are form 20, amplitude 5, and five minutes.
10. A final de-salt wash step is performed by applying de-ionized water in excess to the ProteinChip target (print area). Micromix the sample using form 20, amplitude 5, time 1 minute.
11. Allow the chip to fully air dry. This will take at least ten minutes. Visual assessment is used to determine dryness.
12. Prepare SPA matrix by mixing 200 microliters of acetonitrile and 200 μL of 1% trifluoracetic acid (aqueous) to a tube of Bio-Rad SPA.
13. Apply 1.0 microliters of matrix from step 12 to the target (print area), and allow to fully air dry.
14. Repeat step 13.
15. Read the ProteinChip on a PCS Mass Spectrometry System using Full Surface Scan software, or Ciphergen Express Software if the target area is contained within the eight spot format target area.

Example 7

Immunoprinting for Detection of Beta-Amyloid

An exemplary protocol for immuno-printing for detection of beta-amyloid is as follows:

1. Wash the tissue with physiological buffer, to remove residual blood/serum contaminant proteins.
2. Inject beta-amyloid calibrants mixture
3. Section the tissue to provide the desired surfaces for analysis in a thin slice.
4. Apply excess PBS buffer to the SELDI surface and allow 5 minutes equilibration at ambient temperature.
5. Remove buffer by vacuum aspiration.
6. Apply thin slice section of tissue to pre-wet SELDI surface.
7. Apply low stringency buffer to tissue on the SELDI surface such that the entire exposed surface is engulfed in buffer. (on alternate spots, leave the other spots free of buffer; both conditions give satisfactory results)
8. Place the ProteinChip from step 7 into a humid chamber and store overnight at 4 Degrees Celsius.
9. Remove the ProteinChip from the humid chamber, and remove the tissue using vacuum aspiration, or tweezers.
10. Wash the SELDI surface target area (print area) using a-beta wash buffer (PBS with 0.1 Triton) in excess with micromix agitation. Recommended micromix settings are form 20, amplitude 5, and five minutes.
11. Wash the SELDI surface target area (print area) using PBS buffer in excess with micromix agitation. Recommended micromix settings are form 20, amplitude 5, and five minutes.
12. Repeat step 11
13. A final de-salt wash step is performed by applying de-salting buffer (Hepes 1 mM, ph 7.4) in excess to the ProteinChip target (print area). Micromix the sample using form 20, amplitude 5, time 5 minutes.
14. Allow the chip to fully air dry. This will take at least ten minutes. Visual assessment is used to determine dryness.
15. Prepare CHCA matrix by mixing 200 microliters of acetonitrile and 200 uL of 1% trifluoracetic acid (aqueous) to a tube of Bio-Rad SPA; dilute with the same mixture of solvents to 50%.

16. Apply 1.0 microliters of matrix from step 15 to the target (print area), and allow to fully air dry.
17. Read the ProteinChip on a PCS Mass Spectometry System using Full Surface Scan software, or Ciphergen Express Software if the target area is contained within the eight spot format target area.

We claim:

1. A method of analyzing spatial arrangement of molecules within a sample, said method comprising:

a. transferring a sample to a surface such that said spatial arrangement of said molecules is maintained and wherein said surface comprises an adsorbent film;
b. striking said surface with a laser beam such that a predetermined laser spot on said surface releases sample molecules;
c. and detecting adsorbence of released molecules on said adsorbent film.

2. The method of claim 1, wherein said detecting comprises laser desorption mass spectrometry.

3. The method of claim 1, wherein said sample is a wet sample.

4. The method of claim 1, wherein said transferring comprises applying a liquid to said sample on said surface.

5. The method of claim 4, wherein said liquid is a transfer buffer.

6. The method of claim 4, wherein said liquid is a solvent.

7. The method of claim 1, wherein said surface comprises an affinity reagent.

8. The method of claim 7, wherein said surface further comprises a photo-reactive polymeric material.

9. The method of claim 1, wherein subsequent to step (a) and prior to step (b), an energy absorbing matrix is added to said surface.

10. A method of analyzing a sample, said method comprising:

a. transferring a sample to a surface to form a test surface;
b. striking said test surface with a laser beam such that a predetermined first laser spot on said test surface releases first sample molecules;
c. measuring molecular atomic mass of said released first sample molecules over a range of atomic masses;
d. striking said test surface with said laser beam such that a predetermined second laser spot on said test surface releases second sample molecules;
e. measuring molecular atomic mass of said released second sample molecules over a range of atomic masses;
f. analyzing an atomic mass window within said range of atomic masses to determine said spatial arrangement of molecules within said sample.

11. The method of claim 10, wherein analyzing said atomic mass window comprises graphically depicting mass of molecules within said atomic mass window as a function of linear distance between said first laser spot and said second laser spot.

12. The method of claim 10, wherein said transferring comprises adsorbing molecules from said sample to said surface such that spatial arrangement of said molecules is maintained.

13. The method of claim 12, wherein subsequent to step (a) and prior to step (b), sample molecules that are not adsorbed to said surface are removed.

14. The method of claim 10, wherein subsequent to step (a) and prior to step (b), an energy absorbing matrix is added to said test surface.

15. The method of claim 10, wherein said sample comprises tissue.

16. The method of claim 10, wherein said sample comprises a gel.

17. The method of claim 10, wherein said sample comprises a cell.

18. The method of claim 10, wherein said surface comprises binding functionalities.

19. The method of claim 10, wherein said transferring comprises applying a transfer buffer to said sample on said surface.

20. The method of claim 10, wherein said surface comprises a photo-reactive polymer.

21. The method of claim 10, wherein steps (b) through (f) are repeated until a predetermined area of said sample is analyzed.

22. The method of claim 10, wherein said surface comprises an affinity reagent, wherein said affinity reagent is capable of binding to molecules of said sample, and wherein said affinity reagent is free of said molecules.

23. The method of claim 22, wherein said affinity reagent is a member selected from: a chromatographic functionality, a hydrophobic functionality, and a reactive functionality.

24. The method of claim 22, wherein said affinity reagent is a member selected from: an antibody and a protein.

25. The method of claim 24, wherein said surface further comprises a polymeric material, wherein said polymeric material comprises a photo-reactive polymeric material.

* * * * *